United States Patent
Kim et al.

(10) Patent No.: US 12,526,880 B2
(45) Date of Patent: *Jan. 13, 2026

(54) METHODS AND APPARATUSES FOR TRANSMITTING AND RECEIVING DATA IN WIRELESS COMMUNICATION SYSTEM

(71) Applicant: SAMSUNG ELECTRONICS CO., LTD., Suwon-si (KR)

(72) Inventors: Donggun Kim, Suwon-si (KR); Soenghun Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,818

(22) Filed: May 2, 2024

(65) Prior Publication Data

US 2024/0284559 A1    Aug. 22, 2024

Related U.S. Application Data

(63) Continuation of application No. 17/810,623, filed on Jul. 4, 2022, now Pat. No. 12,004,263, which is a
(Continued)

(30) Foreign Application Priority Data

Feb. 12, 2019    (KR) .................. 10-2019-0016360

(51) Int. Cl.
*H04L 69/22*    (2022.01)
*H04W 28/06*   (2009.01)
(Continued)

(52) U.S. Cl.
CPC ............. *H04W 80/08* (2013.01); *H04L 69/22* (2013.01); *H04W 28/06* (2013.01); *H04W 76/27* (2018.02); *H04W 80/02* (2013.01)

(58) Field of Classification Search
CPC ..... H04W 80/08; H04W 76/27; H04W 28/06; H04W 80/02; H04W 76/20; H04L 69/04; H04L 69/22
(Continued)

(56) References Cited

U.S. PATENT DOCUMENTS 8,958,422 B2    2/2015    Celik et al.
11,330,660 B2 *  5/2022    Jin .................. H04W 80/08
(Continued)

FOREIGN PATENT DOCUMENTS

CN    105103610 A    12/1899
CN    104322123 A    1/2015
(Continued)

OTHER PUBLICATIONS

European Patent Office, "Supplementary European Search Report" issued Jan. 28, 2022, in connection with European Patent Application No. 20755830.5, 10 pages.
(Continued)

*Primary Examiner* — Jason D Cardone

(57) ABSTRACT

Provided is an operating method of a user equipment (UE) in a wireless communication system, the operating method including: receiving, from a base station, a radio resource control (RRC) message including packet data convergence protocol (PDCP) layer configuration information for each data radio bearer (DRB); and when a PDCP entity is configured to be reestablished for each DRB and the PDCP layer configuration information includes an indicator indicating to continuously use header compression protocol configuration information, indicating to a lower layer entity that the header compression protocol configuration information is configured to be continuously used.

20 Claims, 30 Drawing Sheets

Related U.S. Application Data continuation of application No. 16/789,323, filed on Feb. 12, 2020, now Pat. No. 11,382,169.

(51) Int. Cl.
*H04W 76/27* (2018.01)
*H04W 80/02* (2009.01)
*H04W 80/08* (2009.01)

(58) Field of Classification Search
USPC .......................................................... 370/329
See application file for complete search history.

(56) References Cited

U.S. PATENT DOCUMENTS

| | | | |
|---|---|---|---|
| 12,262,440 B2* | 3/2025 | Rayavarapu | H04W 72/23 |
| 2015/0092696 A1 | 4/2015 | Liu et al. | |
| 2017/0013668 A1 | 1/2017 | Chang et al. | |
| 2017/0188269 A1* | 6/2017 | Sunel | H04W 8/22 |
| 2019/0069335 A1* | 2/2019 | Wu | H04W 28/0252 |
| 2019/0159065 A1 | 5/2019 | Kim et al. | |
| 2020/0022046 A1* | 1/2020 | Wang | H04W 76/27 |
| 2020/0162211 A1* | 5/2020 | Wang | H04L 5/0091 |
| 2020/0205123 A1* | 6/2020 | Byun | H04W 76/27 |
| 2020/0367117 A1 | 11/2020 | Yi et al. | |
| 2020/0396789 A1* | 12/2020 | Hori | H04W 28/18 |
| 2021/0282220 A1* | 9/2021 | Hori | H04W 80/08 |
| 2021/0337436 A1* | 10/2021 | Teyeb | H04W 36/0066 |
| 2023/0276311 A1* | 8/2023 | Wu | H04W 36/00 370/331 |

FOREIGN PATENT DOCUMENTS

| | | |
|---|---|---|
| KR | 10-2019-0032167 A | 3/2019 |
| WO | 2013/173957 A1 | 11/2013 |

OTHER PUBLICATIONS

ETSI TS 136 323 V11.4.0 (Sep. 2014), Technical Specification, LTE; Evolved Universal Terrestrial Radio Access (E-UTRA); Packet Data Convergence Protocol (PDCP) specification (3GPP TS 36.323 version 11.4.0 Release 11), 29 pages.
Ericsson, "Remaining MO EDT issues", Change Request, 3GPP TSG-WG Meeting #104, Nov. 12-16, 2018, R2-1816623, 17 pages.
"LTE; Evolved Universal Terrestrial Radio Access (E-UTRA); Radio Resource Control (RRC); Protocol specification (3GPP TS 36.331 version 15.3.0 Release 15)", ETSI TS 136 331 V15.3.0 (Oct. 2018), 917 pages.
Notification of Transmittal of the International Search Report and the Written Opinion of the International Searching Authority, or the Declaration dated May 18, 2020 in connection with International Patent Application No. PCT/KR2020/001824, 9 pages.
Intellectual Property India, "Examination report under sections 12 13 of the Patents Act" dated Jan. 5, 2023, in connection with Indian Patent Application No. 202137037572, 7 pages.
Office Action issued Dec. 18, 2023, in connection with Chinese Patent Application No. 202080014087.1, 14 pages.
Office Action issued Jul. 30, 2024, in connection with Korean Patent Application No. 10-2019-0016360, 6 pages.
Office Action issued Sep. 3, 2024, in connection with Chinese Patent Application No. 202080014087.1, 7 pages.
Hearing Notice dated Mar. 18, 2025 in connection with Indian application No. 202137037572, 2 pages.
Communication under Rule 71(3) EPC dated Nov. 3, 2025, in connection with European Application No. 20755830.5, 112 pages.

* cited by examiner

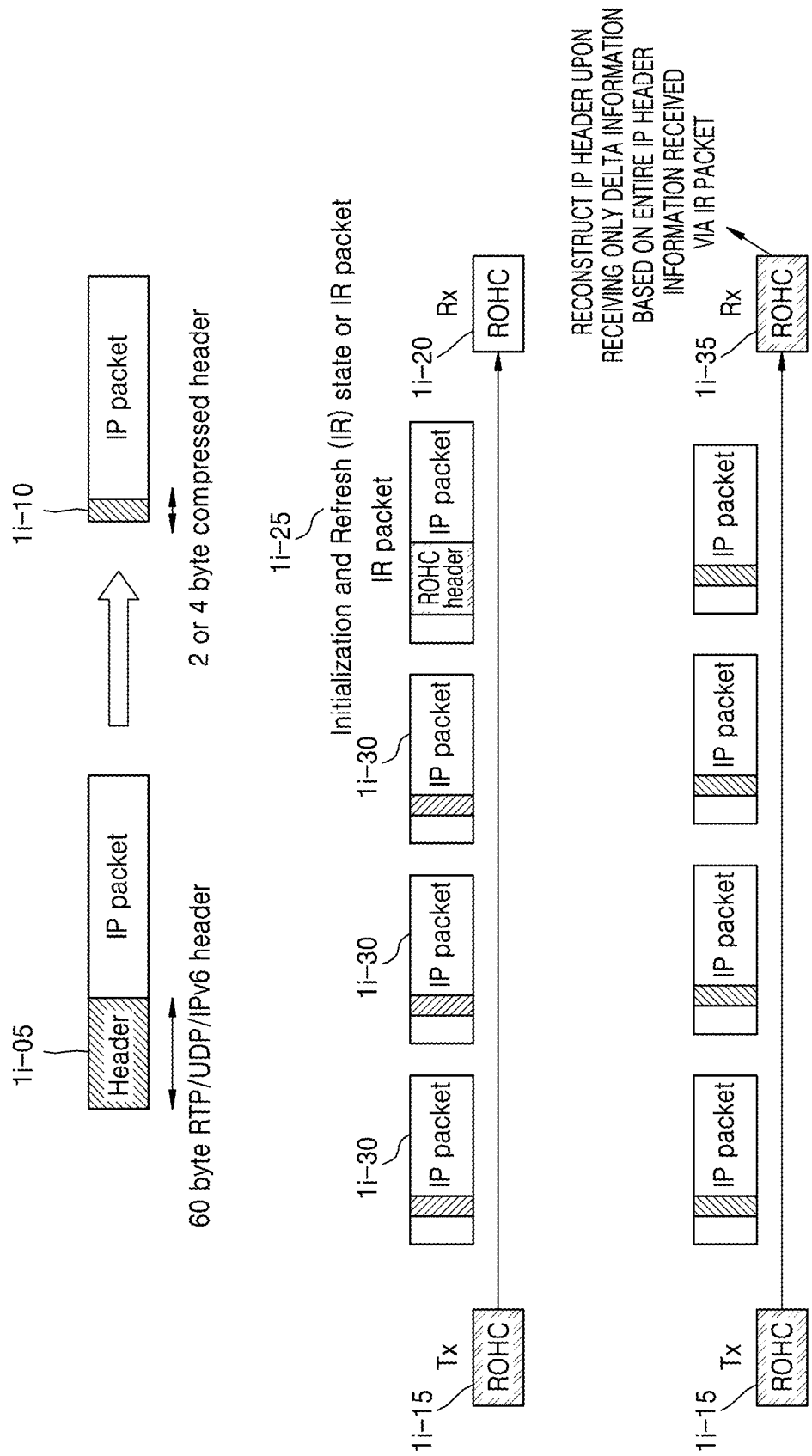

METHODS AND APPARATUSES FOR TRANSMITTING AND RECEIVING DATA IN WIRELESS COMMUNICATION SYSTEM

CROSS-REFERENCE TO RELATED APPLICATION

This application is a continuation of application Ser. No. 17/810,623 filed on Jul. 4, 2022, which is a continuation of application Ser. No. 16/789,323, now U.S. Pat. No. 11,382,169 issued Jul. 5, 2022, which is based on and claims priority under 35 U.S.C. § 119 to Korean Patent Application No. 10-2019-0016360 filed on Feb. 12, 2019 in the Korean Intellectual Property Office, the disclosure of which are incorporated by reference herein in its entirety.

BACKGROUND

1. Field

The disclosure relates to methods and apparatuses for transmitting and receiving data in a wireless communication system. More particularly, the disclosure relates to a method and apparatus for efficiently maintaining header compression configuration information in a wireless communication system. Also, the disclosure relates to a method and apparatus for efficiently performing handover between radio access technologies in a wireless communication system.

2. Description of Related Art

To meet the increase in demand for wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), Full Dimensional MIMO (FD-MIMO), array antennas, analog beam-forming, and large-scale antennas. In order to improve system networks for 5G communication systems, various technologies have been developed, e.g.: evolved small cells, advanced small cells, cloud radio access networks (Cloud-RAN), ultra-dense networks, Device-to-Device communication (D2D), wireless backhaul, moving networks, cooperative communication, Coordinated Multi-Points (COMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA) and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus there is need for methods of smoothly providing such services.

SUMMARY

Provided are a method and apparatus for efficiently maintaining header compression configuration information in a wireless communication system. Also, provided are a method and apparatus for efficiently performing handover between radio access technologies in a wireless communication system. However, the technical problems of the disclosure are not limited to the aforementioned technical features, and other unstated technical problems may be inferred from embodiments below.

Additional aspects will be set forth in part in the description which follows and, in part, will be apparent from the description, or may be learned by practice of the presented embodiments of the disclosure.

According to an embodiment of the disclosure, an operating method of a user equipment (UE) in a wireless communication system, the operating method includes: receiving, from a base station, a radio resource control (RRC) message including packet data convergence protocol (PDCP) layer configuration information for each data radio bearer (DRB); and if a PDCP entity of at least one DRB is configured to be reestablished and if the at least one DRB is configured with the PDCP layer configuration information comprising an indicator indicating to continuously use header compression protocol configuration, indicating to a lower layer entity that the header compression protocol configuration information for the at least one DRB is configured to be continuously used.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1I illustrates a diagram for describing a robust header compression (ROHC) protocol according to an embodiment of the disclosure;

FIG. 1O illustrates a diagram showing a structure of an electronic device for supporting legacy network communication and 5th generation (5G) network communication, according to an embodiment of the disclosure;

DETAILED DESCRIPTION

Figure 1A:
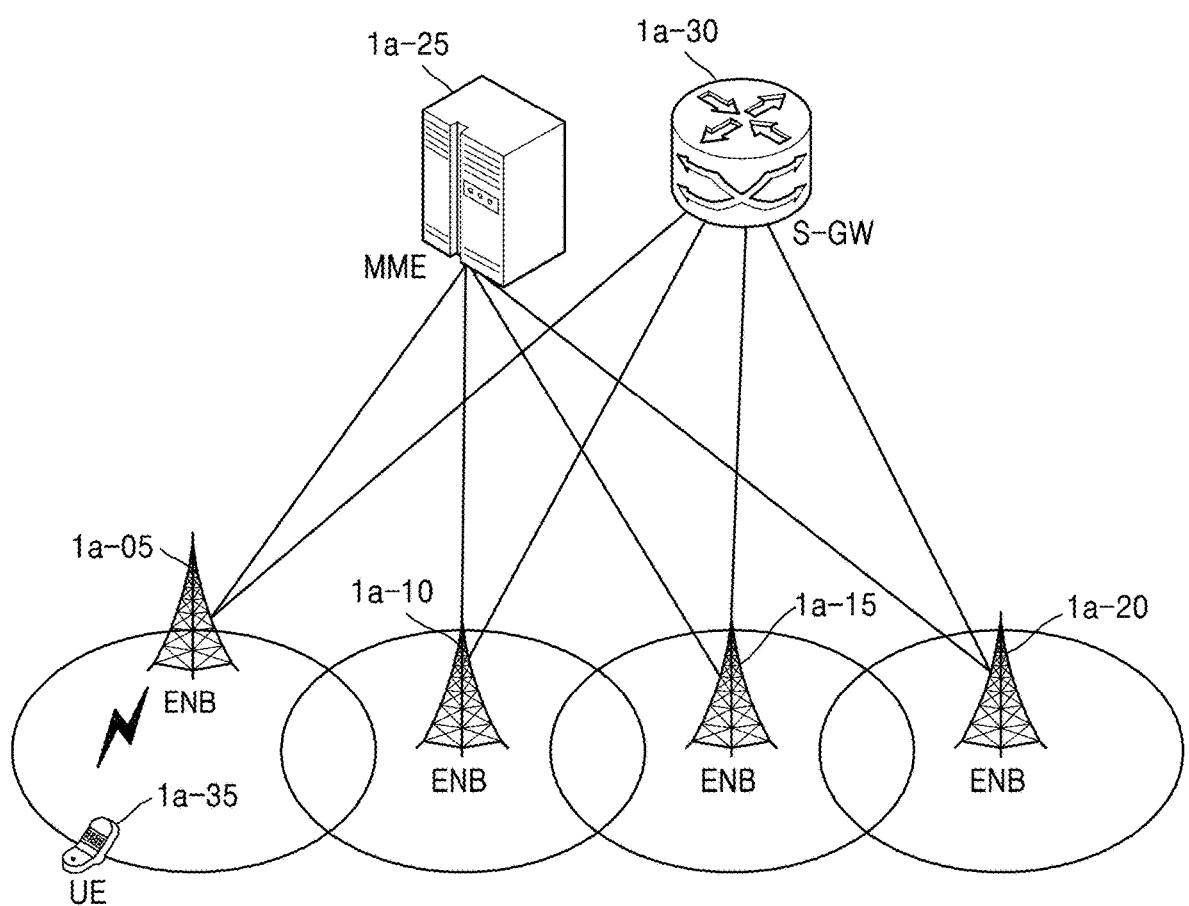
FIG. 1A illustrates a diagram of a structure of a long-term evolution (LTE) system, according to an embodiment of the disclosure.

FIGS. 1A through 2N, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include user equipment (UE), a mobile station (MS), a cellular phone, a smartphone, a computer, and a multimedia system capable of performing a communication function.

In the disclosure, a controller may also be referred to as a processor.

Throughout the specification, a layer (or a layer apparatus) may also be referred to as an entity.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

For the same reasons, components may be exaggerated, omitted, or schematically illustrated in drawings for clarity. Also, the size of each component does not completely reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, the present embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the 3rd Generation Partnership Project Long Term Evolution (3GPP LTE) standard. However, the disclosure is not limited by such terms and names, and may be equally applied to systems conforming to other standards. In the disclosure, an evolved node B (eNB) will be used interchangeably with a next generation node B (gNB) for convenience of description. In other words, a base station described as an eNB may also indicate a gNB.

In a next-generation wireless communication system, a packet data convergence protocol (PDCP) layer may use a header compression protocol (for example, robust header compression (ROHC)) for compressing a header. However, in order to apply the header compression protocol, a transmission PDCP layer and a reception PDCP layer need to exchange and synchronize header compression protocol information (for example, ROHC context). When the header compression protocol information is newly exchanged and synchronized whenever handover is performed, transmission resources are wasted and the start of header compression application is delayed.

In the disclosure, the header compression protocol information that is to be exchanged and synchronized to apply the header compression protocol is enabled to be changelessly used by a target base station during the handover according to an instruction of a base station, such that unnecessary waste of transmission resources and delay of header compression application may be prevented. Also, in the disclosure, when an indicator enabling the header compression protocol information to be changelessly used is defined, the indicator is not defined for each UE but is defined for each bearer such that the indicator indicates differently for each bearer configured in the UE. In addition, existing header compression protocol information may be reused by using the indicator not only during handover but also when the UE reestablishes a connection in a radio resource control (RRC) inactive mode.

In particular, according to some embodiments of the disclosure, because the header compression protocol (for example, ROHC) may be a function set in a PDCP layer, configuration information (for example, ROHC context) of the header compression protocol is not initialized during the handover or RRC connection resumption, and an indicator indicating whether to changelessly use existing header compression protocol configuration information or to reuse the existing header compression protocol configuration information may be defined in PDCP layer configuration information (pdcp-config). Also, as described above, when a header compression protocol configuration information continuous use indicator (drb-ContinueROHC) is defined for each bearer in the PDCP layer configuration information, whether to continuously use the header compression protocol configuration information may be indicated for each bearer of the UE instead of for each UE, the degree of freedom of implementation of a base station may be increased. Also, the header compression protocol configuration information continuous use indicator (drb-ContinueROHC) may be an indicator for a one-time indication. For example, the header compression protocol configuration information continuous use indicator (drb-ContinueROHC) is an indicator indicating whether to continuously use the header compression protocol configuration information as it is or initialize the header compression protocol configuration information at a time of the handover or when an RRC connection is resumed, and thus the stored header compression protocol configuration information continuous use indicator (drb-ContinueROHC) may not be applied during a next handover or next RRC connection resumption. In other words, the header compression protocol configuration information continuous use indicator (drb-ContinueROHC) may be newly configured whenever a handover or RRC connection is resumed.

Also, according to some embodiments of the disclosure, when the UE resumes the RRC connection, only other pieces of configuration information excluding the header compression protocol configuration information continuous use indicator (drb-ContinueROHC) described above may be reconstructed when the stored PDCP layer configuration information is reconstructed. Accordingly, when the base station configures the header compression protocol configuration information continuous use indicator (drb-ContinueROHC) in an RRC message transmitted to the UE, the UE may reconstruct a previous header compression protocol configuration information continuous use indicator (drb-ContiueROHC) among the stored PDCP layer configuration information and not rewrite a newly configured header compression protocol configuration information continuous use indicator (drb-ContiueROHC).

Hereinafter, operations of a UE according to embodiments of the disclosure are proposed.

FIG. 1A illustrates a diagram of a structure of a long-term evolution (LTE) system, according to an embodiment of the disclosure.

Referring to FIG. 1A, a radio access network (RAN) of the LTE system may includes evolved base stations (e.g., eNBs or NBs) 1a-05, 1a-10, 1a-15, and 1a-20, a mobility management entity (MME) 1a-25, and a serving-gateway (S-GW) 1a-30. A user equipment (UE) or a terminal 1a-35 may access an external network via the eNB 1a-05, 1a-10, 1a-15, or 1a-20 and the S-GW 1a-30.

In FIG. 1A, each of the eNBs 1a-05, 1a-10, 1a-15, and 1a-20 may correspond to an existing NB of a universal mobile telecommunications system (UMTS). The CNB 1a-05, 1a-10, 1a-15, or 1a-20 may be connected to the UE 1a-35 through a radio channel and may perform complex functions compared to the existing NB. Because all user traffic data including real-time services such as voice over Internet protocol (VOIP) is serviced through shared channels in the LTE system, an entity for collating buffer status information of UEs, available transmission power status information, channel status information, etc. and performing scheduling is required and each of the eNBs 1a-05, 1a-10, 1a-15, and 1a-20 serves as such an entity. A single eNB may generally control multiple cells. For example, the LTE system may use radio access technology such as orthogonal frequency division multiplexing (OFDM) at a bandwidth of 20 MHz to achieve a data rate of 100 Mbps. The LTE system may also use adaptive modulation and coding (AMC) to determine a modulation scheme and a channel coding rate in accordance with a channel status of the UE 1a-35. The S-GW 1a-30 is an entity for providing data bearers and may configure or release the data bearers under the control of the MME 1a-25. The MME 1a-25 is an entity for performing a mobility management function and various control functions for the UE 1a-35 and may be connected to the eNBs 1a-05, 1a-10, 1a-15, and 1a-20.

Figure 1B:
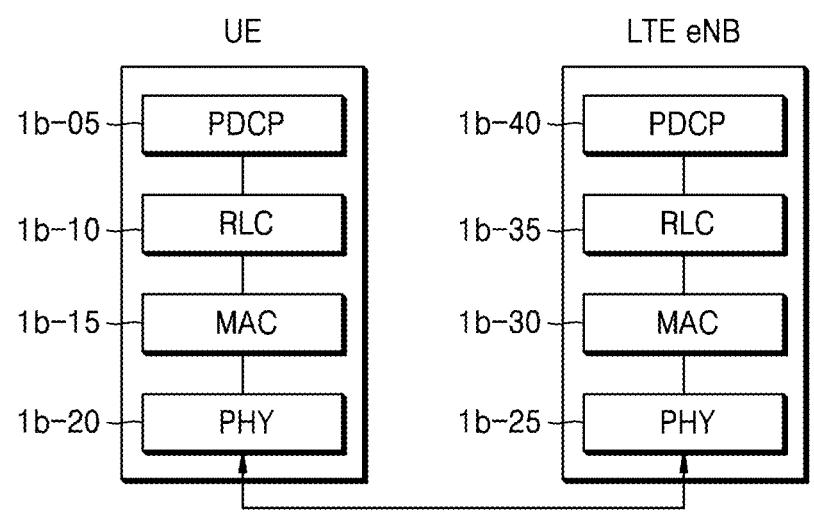
FIG. 1B illustrates a diagram of a radio protocol architecture in an LTE system, according to an embodiment of the disclosure.

FIG. 1B illustrates a diagram of a radio protocol architecture in an LTE system, according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 is in charge of IP header compression/decompression, etc. Main functions of the PDCP layer 1b-05 or 1b-40 may be summarized as below.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 may perform, for example, an automatic repeat request (ARQ) operation by reconfiguring PDCP PDUs to appropriate sizes. Main functions of the RLC layer 1b-10 or 1b-35 may be summarized as below.

Transfer of upper layer PDUs
Error Correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 may be summarized as below.

Mapping between logical channels and transport channels
Multiplexing/demultiplexing of MAC SDUs belonging to one or different logical channels into/from TB delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A physical (PHY) layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1C:
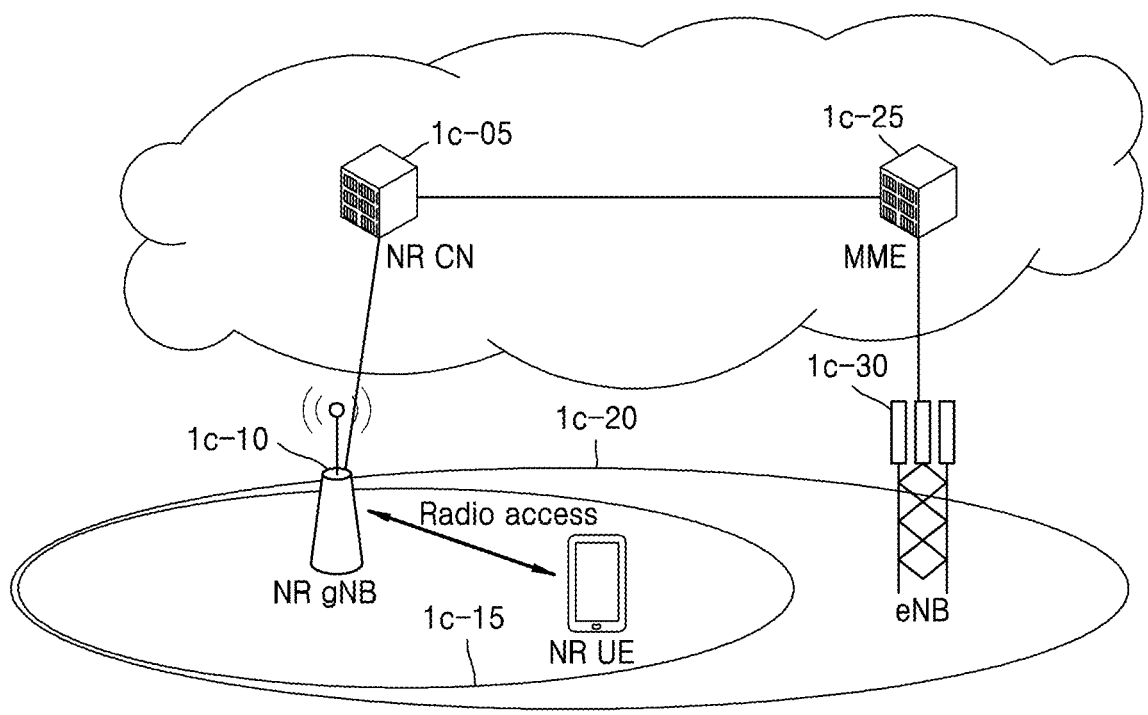
FIG. 1C illustrates a diagram of a structure of a next-generation wireless communication system, according to an embodiment of the disclosure.

FIG. 1C illustrates a diagram of a structure of a next-generation wireless communication system, according to an embodiment of the disclosure.

Referring to FIG. 1C, a RAN of the next-generation wireless communication system (e.g., a new radio (NR) or 5G system) may include a new radio node B (NR NB) or new radio next generation node B (NR gNB) 1c-10 and a new radio core network (NR CN) or next generation core network (NG CN) 1c-05. A new radio user equipment (NR UE) or terminal 1c-15 may access an external network via the NR gNB 1c-10 and the NR CN 1c-05.

In FIG. 1C, the NR gNB 1c-10 may correspond to an eNB of an existing LTE system. The NR gNB 1c-10 is connected to the NR UE 1c-15 through radio channels and may provide superior services compared to an existing NB. Because all user traffic data is serviced through shared channels in the next-generation wireless communication system, an entity for collating buffer status information of UEs, available transmission power status information, channel status information, etc. and performing scheduling is required and such operations may be performed by the NR gNB 1c-10. A single NR gNB 1c-10 may control multiple cells. In the next-generation wireless communication system, a bandwidth greater than the maximum bandwidth of LTE may be given to achieve a current ultrahigh data rate, and beamforming technology may be additionally used with OFDM as radio access technology.

The next-generation wireless communication system may also use AMC to determine a modulation scheme and a channel coding rate in accordance with a channel status of the NR UE 1a-15. The NR CN 1c-05 may perform functions such as mobility support, bearer setup, and quality of service (QOS) setup. The NR CN 1c-05 is an entity for performing a mobility management function and various control functions for the UE 1c-15 and may be connected to multiple NR gNBs 1c-10. The next generation wireless communication system may cooperate with the existing LTE system, and the NR CN 1c-05 may be connected to an MME 1c-25 through a network interface. The MME 1c-25 may be connected to an existing eNB 1c-30.

Figure 1D:
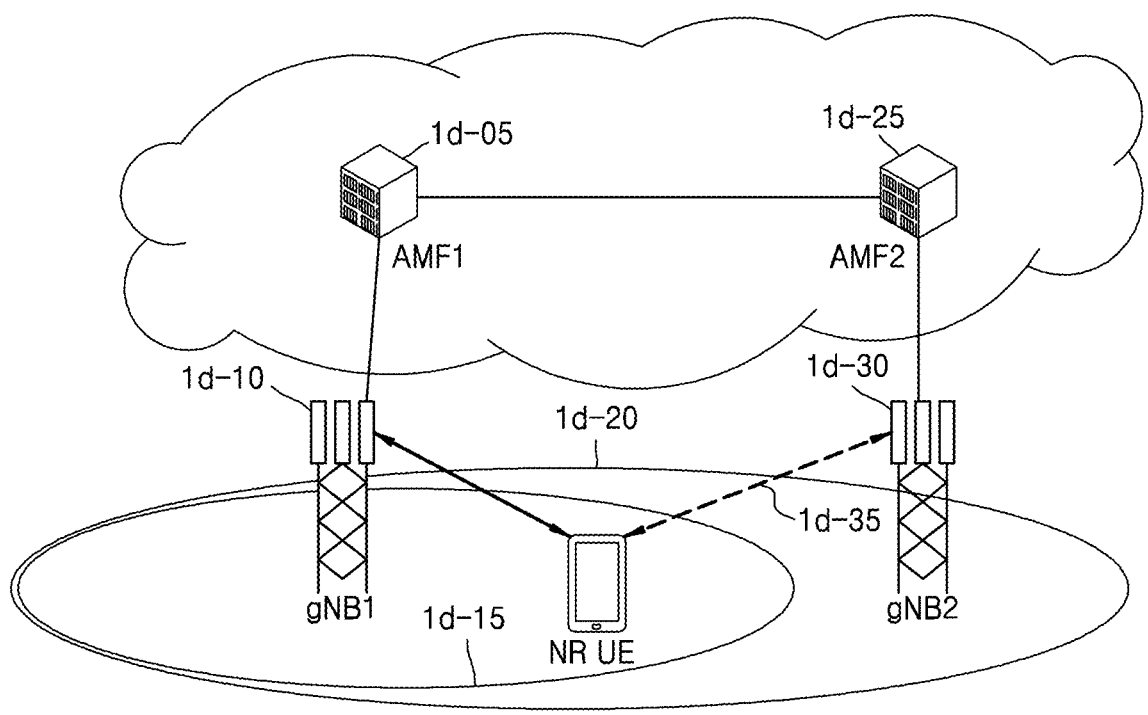
FIG. 1D illustrates a diagram of a structure of a next-generation wireless communication system, according to an embodiment of the disclosure.
Figure 1E:
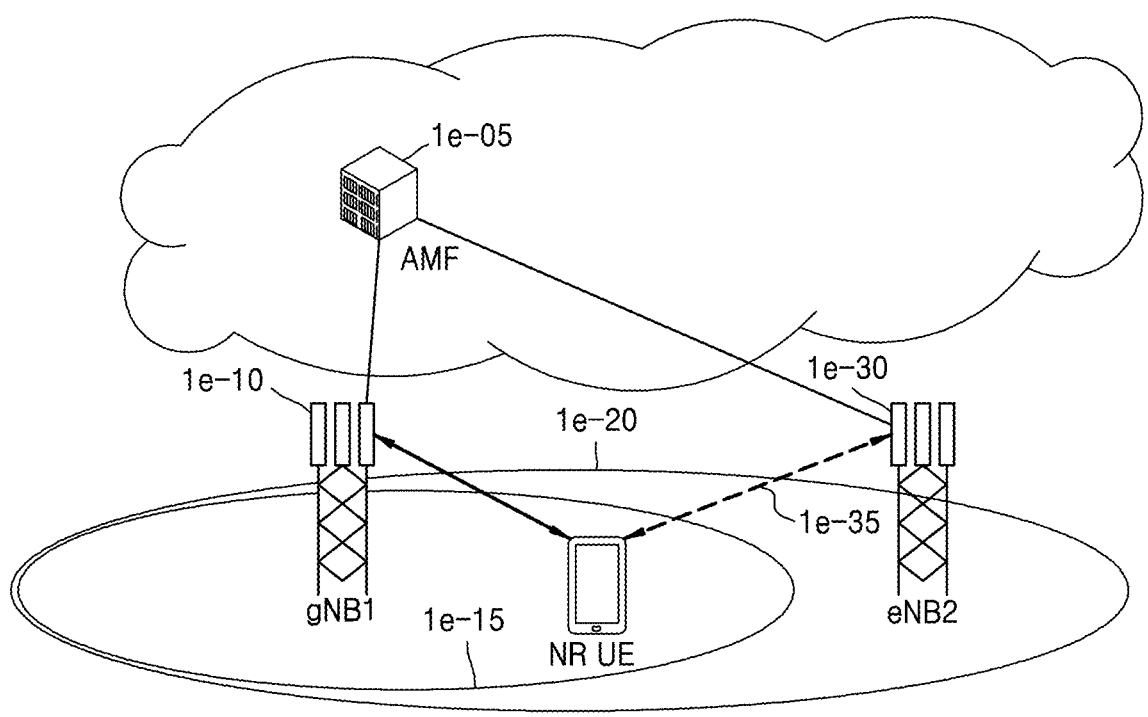
FIG. 1E illustrates a diagram of a structure of a next-generation wireless communication system, according to an embodiment of the disclosure.

FIGS. 1D and 1E illustrates diagrams of a structure of a next-generation wireless communication system, according to an embodiment of the disclosure.

Referring to FIGS. 1D and 1E, examples of configuring new radio-dual connectivity (NR-DC) are shown. As shown in FIGS. 1D and 1E, an RAN of the next-generation wireless communication system may include gNBs 1d-10 and 1d-25, and 1e-10 and 1e-30, and access and mobility management functions (AMFs) 1d-05 and 1d-25, and 1e-05 (new radio core network). A new radio user equipment (NR UE) or terminal 1d-15 or 1e-15 may access an external network via the gNB 1d-10 or 1e-10, and the ANF 1d-05 or 1e-05.

Referring to FIGS. 1C through 1E, a situation in which a macrocell and picocell coexist may be considered. The macrocell is a cell controlled by a macro base station and may provide a service in a relatively wide area (coverage area). On the other hand, the picocell is a cell controlled by a secondary base station (secondary eNB (SeNB) or secondary gNB (SgNB), and provides a service in a significantly small area compared to a general macrocell. There is no strict criterion for distinguishing the macrocell and the picocell, but for example, an area of the macrocell may be about 500 m in radius and an area of the picocell may be about tens of meters in radius. According to embodiments of the disclosure, a cell may include the picocell and the macrocell. In this case, the macrocell may be an LTE base station (master eNB (MeNB)) or an NR base station (master gNB (MgNB)), and the picocell may be an NR base station (SgNB) or an LTE base station (SeNB). In particular, a 5G base station supporting the picocell may use a frequency band equal to or greater than 6 GHz.

In embodiments of the disclosure, a situation in which the macrocells coexist may be considered. The macrocell is a cell controlled by a macro base station and may provide a service in a relatively wide area. In this case, the macrocell may include an LTE base station (MeNB) and an LTE base station (SeNB). According to another embodiment of the disclosure, the macrocell may include an LTE base station (MeNB) and an NR base station (SgNB). According to another embodiment of the disclosure, the macrocell may include an NR base station (MgNB) and an LTE base station (SeNB). According to another embodiment of the disclosure, the macrocell may include an NR base station (MgNB) and an NR base station (SgNB).

Figure 1F:
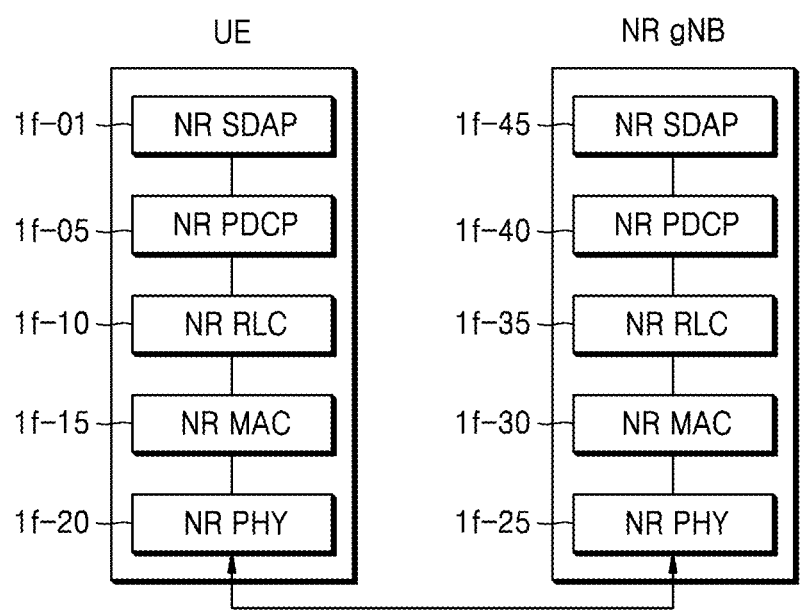
FIG. 1F illustrates a diagram of a radio protocol architecture of a next-generation wireless communication system, according to an embodiment of the disclosure.

FIG. 1F illustrates a diagram of a radio protocol architecture of a next-generation wireless communication system, according to an embodiment of the disclosure.

Referring to FIG. 1F, the radio protocol architecture of the next-generation wireless communication system includes NR service data adaptation protocol (SDAP) layers 1*f*-01 and 1*f*-45, NR PDCP layers 1*f*-05 and 1*f*-40, NR RLC layers 1*f*-10 and 1*f*-35, and NR MAC layers 1*f*-15 and 1*f*-30, respectively for a UE and an NR gNB.

Main functions of the NR SDAP layers 1*f*-01 and 1*f*-45 may include some of the following functions.
  Transfer of user plane data
  Mapping between QoS flow and a data radio bearer (DRB) for both DL and UL
  Marking QoS flow ID in both DL and UL packets
  Reflective QoS flow to DRB mapping for the UL SDAP PDUs With respect to an SDAP layer, the UE may receive, via an RRC message, settings on whether to use a header of the SDAP layer or use a function of the SDAP layer for each PDCP layer, bearer, or logical channel. When an SDAP header is set, the UE may instruct a non-access stratum (NAS) reflective QoS 1-bit indicator and an access stratum (AS) reflective QoS 1-bit indicator of the SDAP header to update or reset mapping information regarding the data bearer and the QoS flow of UL and DL. The SDAP header may include QoS flow ID indicating QoS. QoS information may be used as data processing priority information, scheduling information, etc. for supporting a smooth service.

Main functions of the NR PDCP layer 1*f*-05 or 1*f*-40 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink A reordering function (PDCP PDU reordering for reception) of the NR PDCP layer 1*f*-05 or 1*f*-40 may include denote a function of reordering PDCP PDUs received from a lower layer, based on a PDCP sequence number (SN). The reordering function (PDCP PDU reordering for reception) of the NR PDCP layer 1*f*-05 or 1*f*-40 may include a function of delivering the reordered data to an upper layer in order, a function of immediately delivering the reordered data without considering an order, a function of recording missing PDCP PDUs by reordering the PDCP PDUs, a function of reporting status information of the missing PDCP PDUs to a transmitter, and a function of requesting to retransmit the missing PDCP PDUs.

The main functions of the NR RLC layer 1*f*-10 or 1*f*-35 may include at least some of the following functions.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC layer 1*f*-10 or 1*f*-35 may denote a function of delivering RLC SDUs received from a lower layer, to an upper layer in order. The in-sequence delivery function of the NR RLC layer 1*f*-10 or 1*f*-35 may include a function of reassembling multiple RLC SDUs segmented from an RLC SDU and delivering the RLC SDU when the segmented RLC SDUs are received, a function of reordering received RLC PDUs on an RLC SN or PDCP SN basis, a function of recording missing RLC PDUs by reordering the RLC PDUs, a function of reporting status information of the missing RLC PDUs to a transmitter, a function of requesting to retransmit the missing RLC PDUs, a function of delivering only RLC SDUs previous to a missing RLC SDU, to the upper layer in order, when the missing RLC SDU exists, a function of delivering all RLC SDUs received before a timer is started, to the upper layer in order, although a missing RLC SDU exists, when a certain timer is expired, and a function of delivering all RLC SDUs received up to a current time, to the upper layer in order, although a missing RLC SDU exists, when a certain timer is expired. Further, the NR RLC layer 1*f*-10 or 1*f*-35 may process the RLC PDUs in order of reception (in order of arrival regardless of sequence numbers) and deliver the RLC PDUs to a PDCP entity out of order (out-of sequence delivery), and reassemble segments received or stored in a buffer, into a whole RLC PDU and process and deliver the RLC PDU to the PDCP layer. The NR RLC layer 1*f*-10 or 1*f*-35 may not have a concatenation function, and the concatenation function may be performed by the NR MAC layer 1*d*-15 or 1*d*-30 or be replaced with a multiplexing function of the NR MAC layer 1*f*-15 or 1*f*-30.

Out-of-sequence delivery of the NR RLC layer 1*f*-10 or 1*f*-35 may denote a function of delivering RLC SDUs received from a lower layer, immediately to an upper layer out of an order. The out-of-sequence delivery function of the NR RLC layer 1*f*-10 or 1*f*-35 may include a function of reassembling multiple RLC SDUs segmented from an RLC SDU and delivering the RLC SDU when the segmented RLC SDUs are received and a function of storing RLC SNs or PDCP SNs of received RLC PDUs and recording missing RLC PDUs by ordering the RLC PDUs.

The NR MAC layer 1*f*-15 or 1*f*-30 may be connected to multiple NR RLC layers 1*f*-10 or 1*f*-35 configured for a single UE, and main functions of the NR MAC layer 1*f*-15 or 1*f*-30 may include at least some of the following functions.
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding A NR PHY layer 1*f*-20 or 1*f*-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1G:
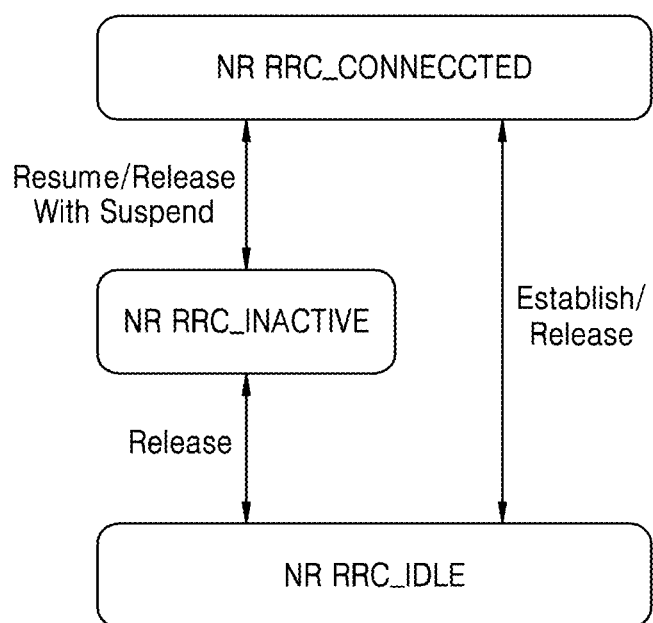
FIG. 1G illustrates a diagram showing a radio resource control (RRC) mode of a user equipment (UE) belonging to a next-generation wireless communication system, and transition relationship between modes, according to an embodiment of the disclosure.

FIG. 1G illustrates a diagram showing a RRC mode of a UE belonging to a next-generation wireless communication system, and transition relationship between modes, according to an embodiment of the disclosure. Features of each RRC mode of the UE are as follows.

RRC_IDLE:

The UE may perform a discontinuous reception (DRX) operation according to a configuration related to the DRX operation configured by an upper layer The UE may perform inter-cell movement based on a base station configuration.

The UE may monitor a short message service (SMS) by using P-RNTI transmitted from downlink control information (DCI). Also, the UE may monitor a paging channel for a core network-based paging signal by using 5G-S-temporary mobile subscription identifier (5G-S-TMSI). Also, the UE may perform a measurement or re(selection) process regarding a neighboring cell. Also, the UE may receive system information or, when supported, request the base station to transmit the system information.

RRC_INACTIVE:

The UE may perform the DRX operation according to the configuration related to the DRX operation configured by the upper layer or an RRC layer.

The UE may perform the inter-cell movement based on the base station configuration.

The UE may store UE inactive AS context.

The UE may be configured with respect to an RAN-based notification area by the RRC layer.

The UE may transmit or receive unicast data.

The UE may monitor the SMS by using P-RNTI transmitted from DCI, according to configuration. Also, the UE may monitor the paging channel for the core network-based paging signal by using 5G-S-TMSI and for an RAN-based paging signal using full-RNTI. Also, the UE may perform the measurement or re(selection) process regarding the neighboring cell. Also, the UE may perform an RAN-based notification area update process periodically or when outside the RAN-based notification area. Also, the UE may receive the system information or, when supported, request the base station to transmit the system information.

RRC_CONNECTED:

The UE may store the AS context.

The UE may transmit or receive unicast data.

The UE may operate according to DRX set by the base station, in a lower layer.

The UE supporting CA may simultaneously use at least one Scell or SpCell.

The UE supporting DC may simultaneously use at least one SCG or MCG.

The UE may perform inter-cell movement in NR or between NR-LTE according to indication of the base station. Alternatively, the UE may perform inter-cell movement in NR or between NR-LTE according to determination of the UE based on the base station configuration.

The UE may monitor the SMS by using P-RNTI transmitted from DCI. The UE may monitor a control channel to determine whether there is scheduled data. The UE may perform channel measurement and transmit a measurement result to the base station. Also, the UE may perform the measurement or re(selection) process regarding the neighboring cell. Also, the UE may receive the system information.

Figure 1H:
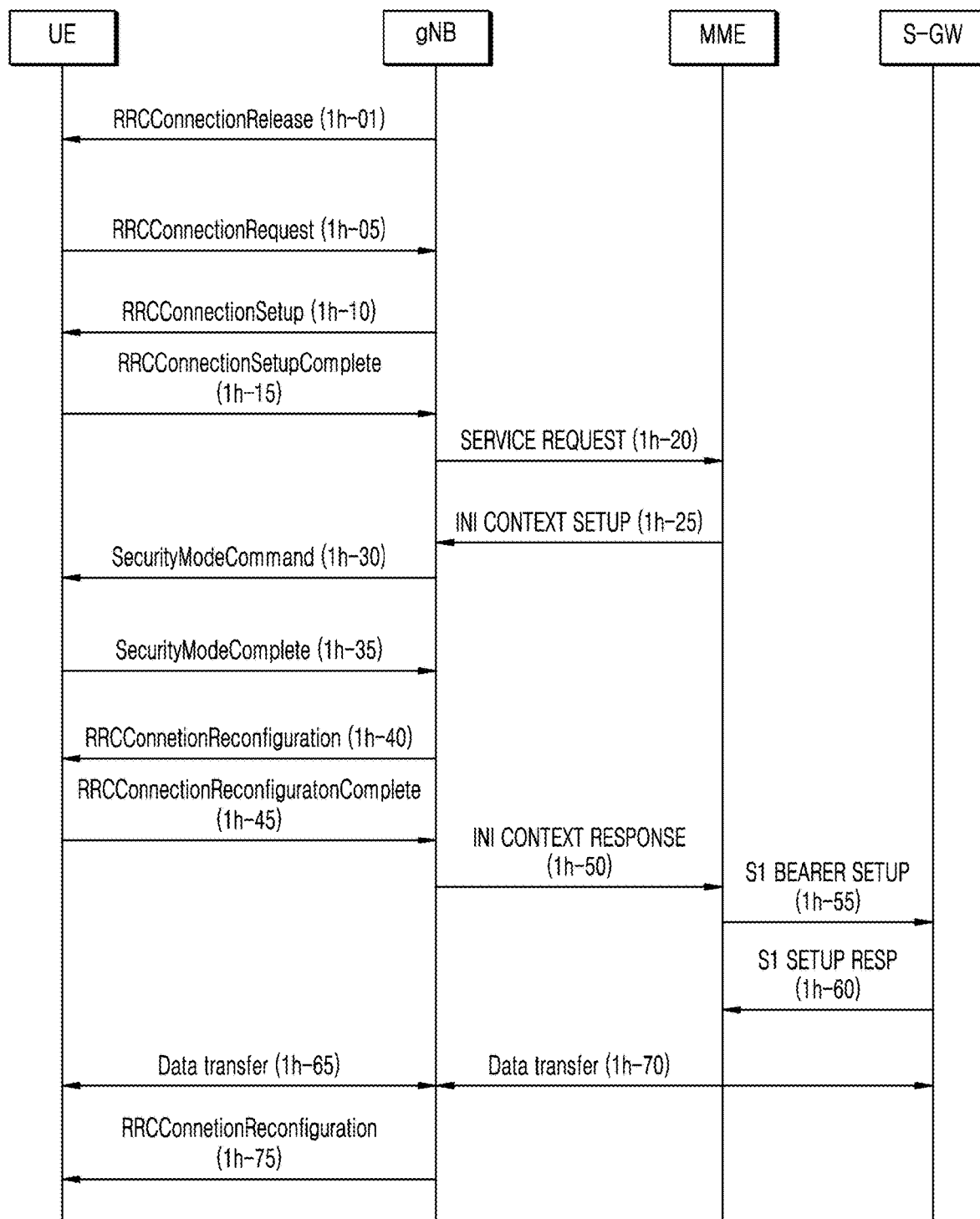
FIG. 1H illustrates a diagram for describing a procedure of establishing a connection between a UE and a network, according to an embodiment of the disclosure.

FIG. 1H illustrates a diagram for describing procedures of a UE establishing a connection with a network by switching from an RRC idle mode to an RRC connected mode, according to an embodiment of the disclosure.

Referring to FIG. 1H, when the UE that transmits or receives data in the RRC connected mode does not transmit or receive data for a certain reason or for a certain time, a gNB may transmit an RRCConnectionRelease message to the UE to switch to the RRC idle mode (operation 1h-01). Thereafter, when data to be transmitted is generated, the UE that has not currently established a connection (hereinafter, the idle mode UE) may perform an RRC connection establishment procedure with the gNB. The UE may establish reverse transmission synchronization with the CNB through a random access procedure and transmit an RRCConnectionRequest message to the gNB (operation 1h-05). The RRCConnectionRequest message may include an identifier of the UE, establishment cause, or the like.

The gNB may transmit an RRCConnectionSetup message such that the UE establishes an RRC connection (operation 1h-10). The RRCConnectionSetup message may include configuration information for each service/bearer/RLC layer or for each logical channel or bearer, and may include information about whether to use ROHC for each bearer/logical channel, ROHC configuration information (for example, ROHC version or initial information), statusReportRequired information (information instructing UE for PDCP status report by gNB), and drb-ContinueROHC information (configuration information for maintaining and changelessly using ROHC configuration information and included and transmitted in PDCP layer configuration information (pdcp-config)). Also, the RRCConnectionSetup message may include RRC connection configuration information or the like. A bearer for RRC connection is also referred to as a signaling radio bearer (SRB) and may be used during transmission and reception of an RRC message that is a control message between the UE and the gNB.

The UE that established the RRC connection may transmit an RRCConnectionSetupComplete message to the gNB (operation 1h-15). The RRCConnectionSetupComplete message may include a control message such as a SERVICE REQUEST message for requesting an MME to configure a bearer for a certain service by the UE. The gNB may transmit the SERVICE REQUEST message included in the RRCConnectionSetupComplete message to the MME (operation 1h-20), and the MME may determine whether to provide the service requested by the UE. As a result of the determination, when the service requested by the UE is to be provided, the MME may transmit an INITIAL CONTEXT SETUP REQUEST message to the gNB (operation 1h-25). The INITIAL CONTEXT SETUP REQUEST message may include QoS information to be applied in configuring a DRB, security information (e.g., a security key, a security algorithm, or the like) to be applied to the DRB, or the like. The gNB may exchange a SecurityModeCommand message (operation 1h-30) and a SecurityModeComplete message (operation 1h-35) with the UE to configure a security mode. After the security mode is configured, the gNB may transmit an RRCConnectionReconfiguration message to the UE (operation 1h-40).

The RRCConnectionReconfiguration message may include configuration information for each service/bearer/RLC layer or for each logical channel or bearer, and may include information about whether to use ROHC for each bearer/logical channel, ROHC configuration information (for example, ROHC version or initial information), statusReportRequired information (information instructing UE for PDCP status report by gNB), and drb-ContinueROHC information (configuration information for maintaining and changelessly using ROHC configuration information and included and transmitted in PDCP layer configuration information (pdcp-config)). Also, the RRCConnectionReconfiguration message may include RRC connection configuration information or the like. A bearer for RRC connection is also referred to as an SRB and may be used during transmission and reception of an RRC message that is a control message between the UE and the gNB.

Also, the RRCConnectionReconfiguration message may include configuration information about the DRB to process user data, and the UE may configure the DRB by using the configuration information and transmit an RRCConnectionReconfigurationComplete message to the gNB (operation 1h-45). Upon completing the DRB configuration with the UE, the eNB transmits an INITIAL CONTEXT SETUP COMPLETE message to the MME (operation 1h-50), and upon reception, the MME may exchange an S1 BEARER SETUP message and an S1 BEARER SETUP RESPONSE message with an S-GW to configure an S1 bearer (operations 1h-55 and 1h-60). The S1 bearer is a connection for data transmission, which is configured between the S-GW and the gNB, and may correspond to the DRB in a one-to-one manner. After the above procedures are completed, the UE may transmit or receive data to or from the gNB through the S-GW in operations 1g-65 and 1g-70. As such, general data transmission processes may largely include three steps of RRC connection establishment, security setting, and DRB configuration. Also, the gNB may transmit, to the UE, an RRCConnectionReconfiguration message to renew, add, or change the configuration for a certain reason (1h-75). [Table 1] below is an example of PDCP configuration information included in an RRC Connection Reconfiguration message.

TABLE 1

```
PDCP-Config ::=              SEQUENCE {
   drb                       SEQUENCE {
      discardTimer           ENUMERATED {ms10, ms20, ms30, ms40, ms50, ms60, ms75, ms100,
ms150, ms200,
                             ms250, ms300, ms500, ms750, ms1500, infinity}
      pdcp-SN-SizeUL         ENUMERATED {len12bits, len18bits}
      pdcp-SN-SizeDL         ENUMERATED {len12bits, len18bits} headerCompression
CHOICE {
      notUsed                      NULL,
      rohc                         SEQUENCE {
         maxCID                    INTEGER (1..16383)           DEFAULT 15,
         profiles                  SEQUENCE {
            profile0x0001               BOOLEAN,
            profile0x0002               BOOLEAN,
            profile0x0003               BOOLEAN,
            profile0x0004               BOOLEAN,
            profile0x0006               BOOLEAN,
            profile0x0101               BOOLEAN,
            profile0x0102               BOOLEAN,
            profile0x0103               BOOLEAN,
            profile0x0104               BOOLEAN
         },
         drb-ContinueROHC                ENUMERATED { true }
OPTIONAL   -- Need N
      },
      uplinkOnlyROHC               SEQUENCE {
         maxCID                    INTEGER (1..16383)           DEFAULT 15,
         profiles                  SEQUENCE {
            profile0x0006             BOOLEAN
         },
         drb-ContinueROHC                ENUMERATED { true }
OPTIONAL   -- Need N
      },
      ...
   },
   integrityProtection       ENUMERATED { enabled }
   statusReportRequired      ENUMERATED { true }
   outOfOrderDelivery        ENUMERATED { true }
}                                                               OPTIONAL,
   moreThanOneRLC            SEQUENCE {
      primaryPath            SEQUENCE {
         cellGroup           CellGroupId                  OPTIONAL, --Need R
         logicalChannel      LogicalChannelIdentity       OPTIONAL -- Need R
      },
      ul-DataSplitThreshold  UL-DataSplitThreshold             OPTIONAL,
      pdcp-Duplication       BOOLEAN                      OPTIONAL  -- Need R
   }                                            OPTIONAL,
   ...,
}
UL-DataSplitThreshold ::= ENUMERATED {
   b0, b100, b200, b400, b800, b1600, b3200, b6400, b12800, b25600, b51200, b102400, b204800,
   b409600, b819200, b1228800, b1638400, b2457600, b3276800, b4096000, b4915200, b5734400,
   b6553600, infinity, spare8, spare7, spare6, spare5, spare4, spare3, spare2, spare1}
```

The RRC Connection Reconfiguration message may include configuration information for each service/bearer/RLC layer or for each logical channel or bearer, and may include information about whether to use ROHC for each bearer/logical channel, ROHC configuration information, statusReportRequired information, and drb-ContinueROHC information. According to an embodiment of the disclosure, the ROHC configuration information may include, for example, at least one of an ROHC version or initial information. According to an embodiment of the disclosure, the statusReportRequired information may indicate information indicating to report a PDCP status from a base station to a UE. According to an embodiment of the disclosure, the drb-ContinueROHC information is configuration information indicating to maintain and changelessly use the ROHC configuration, and may be transmitted by being included in PDCP layer configuration information (pdcp-config). Among pieces of information included in the RRC Connection Reconfiguration message, UL-DataSplitThreshold may set a reference value for determining, with respect to a method of transmitting uplink (UL) data, a method of dividing and transmitting one piece of data or a method of coping same data and transmitting the copied data via different paths. Also, the RRC Connection Reconfiguration message may include RRC connection configuration information or the like. A bearer for RRC connection is also referred to as an SRB and may be used during transmission and reception of an RRC message that is a control message between the UE and the base station.

In the disclosure, a bearer may denote an SRB and a DRB, wherein SRB stands for a signaling radio bearer and the DRB stands for a data radio bearer. The SRB may be used to transmit and receive the RRC message of the RRC layer, and the DRB may be mainly used to transmit and receive user layer data. Also, a UM DRB may denote a DRB using an RLC layer operating in an unacknowledged mode (UM), and an AM DRB may denote a DRB using an RLC layer operating in an acknowledged mode (AM).

FIG. 1I illustrates a diagram for describing a ROHC protocol according to an embodiment of the disclosure.

An IP header 1f-05 and a header 1f-10 of FIG. 1I indicate that a header overhead of an IP packet may be reduced when ROHC protocol is applied. For example, when IPv6 header is used, the IP header 1f-05 having the size of 60 bytes may be compressed to the header 1f-10 having the size of 2 or 4 bytes. A header compression method of the ROHC protocol may not be a method using compression coding or source coding. In other words, the header compression method of the ROHC protocol may be as follows. First, entire header information (a source IP address, a destination IP address, TCP/IP sequence number, and the like) of an IP header and configuration information (context identifier (CID) and the like) of an ROHC protocol may be shared by a transmission PDCP layer and a reception PDCP layer. The entire header information of the IP header and the configuration information of the ROHC protocol may be transmitted by being included in an initialization and refresh state (IR) packet, the transmission PDCP layer may piggyback the entire header information and the configuration information on a PDCP data PDU to the reception PDCP layer, and the reception PDCP layer may receive and share the entire header information and the configuration information. Most of the shared information is fixed information (the source IP address, the destination IP address, and the like) that does not change until connection reestablishment, and only a portion thereof may be dynamic information (the CID, the TCP/IP sequence number, and the like). Accordingly, after the transmission PDCP layer and the reception PDCP layer once share the entire header information and the configuration information of the ROHC protocol, the transmission PDCP layer transmits only the dynamic information to the reception PDCP layer. As such, when the transmission PDCP layer transmits only the dynamic information without transmitting the entire head information of the IP header, the header overhead may be transmitted after being reduced and compressed. Accordingly, the ROHC protocol operates normally only when the reception PDCP layer normally receives the IR packet. Accordingly, a transmitting end may transmit the IR packet several times.

The header compression protocol (ROHC protocol) may be applied to the PDCP layer, and the ROHC protocol is unable to be used normally when the entire header information and the configuration information of the ROHC protocol are not shared and synchronized between a transmission PDCP layer and a reception PDCP layer (1i-15, 1i-20). In other words, the reception PDCP layer is unable to decompress the compressed IP header when the transmission PDCP layer and the reception PDCP layer do not share and synchronize the entire header information and the configuration information (1i-15, 1i-20), even when the transmission PDCP layer compresses and transmits the IP header.

Accordingly, the transmission PDCP layer first transmits an IR packet 1i-25 including the entire header information and the configuration information to the reception PDCP layer, and upon receiving the IR packet 1i-25, the reception PDCP layer synchronize entire header information and configuration information with those of the transmission PDCP layer (1i-15, 1i-35). The transmission PDCP layer may compress and transmit a header (1i-30) by applying the ROHC protocol on the IP packet after synchronization, and the reception PDCP layer may decompress an ROHC header with respect to the received IP packet.

Figure 1J:
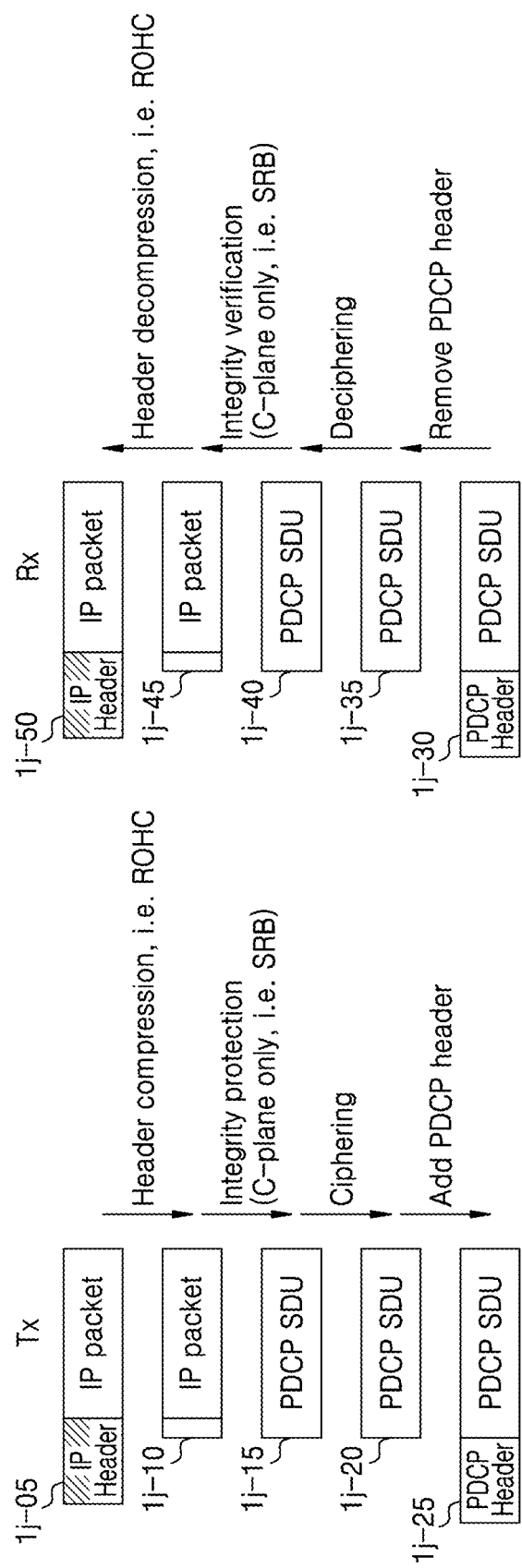
FIG. 1J illustrates a diagram for describing a data processing procedure of a transmission packet data convergence protocol (PDCP) layer and a reception PDCP layer, according to an embodiment of the disclosure.

FIG. 1J illustrates a diagram for describing a data processing procedure of a transmission PDCP layer and a reception PDCP layer, according to an embodiment of the disclosure.

Upon receiving an IP packet (1j-05), a transmission PDCP layer performs header compression (1j-10) on an IP header when the transmission PDCP layer uses an ROHC protocol and performs integrity protection (1j-15) on control plane data or SRB. Also, the transmission PDCP layer may perform encoding on data on which the header compression and the integrity protection are performed, by using a security key and a count value (1j-20). Also, the transmission PDCP layer may assign a PDCP SN with respect to the encoded data, configure a header field corresponding to the data (control plane data or user plane data), attach a header to the encoded data, and transmit the header to a lower layer.

Upon receiving a PDCP PDU from the lower layer, a reception PDCP layer may read a PDCP SN and header field of a PDCP header and remove the PDCP header (1j-30). The reception PDCP layer may perform decoding on the data from which the header is removed, by using a security key and a count value (1j-35). Also, the reception PDCP layer may perform integrity verification on the control plane data or SRB (1j-40). Also, when the header is compressed via a PDCP protocol, the reception PDCP layer may decompress the header and reconstructs an original IP header (1j-45). Also, the reception PDCP layer may transmit the reconstructed IP packet to an upper layer (1j-50).

Throughout the disclosure, the term 'order' may denote an ascending order. In the disclosure, header decompression may include a procedure in which a ROHC protocol verifies a header of a TCP/IP packet or an upper layer packet, and when a packet is an IR packet, the header decompression may include operations of verifying information of the IR packet and updating configuration information of the ROHC protocol according to the verified information, and when the header is compressed, the header decompression may include an operation of verifying the configuration information of the ROHC protocol and reconstructing the decompressed header.

The transmission PDCP layer and the reception PDCP layer described in the disclosure may be entities in which each PDCP layer belongs to a UE or to a base station, according to a downlink (DL) scenario and an UL scenario. In other words, in the UL scenario, the transmission PDCP layer may denote an entity of a UE and the reception PDCP layer may denote an entity of a base station. Also, in the DL scenario, the transmission PDCP layer may denote an entity of a base station and the reception PDCP layer may denote an entity of a UE. A reestablishment procedure of the transmission PDCP layer and the reception PDCP layer described in the disclosure may be applied to both scenarios, and operations of the transmission PDCP layer and operations of the reception PDCP layer may also be applied to both scenarios.

Figure 1K:
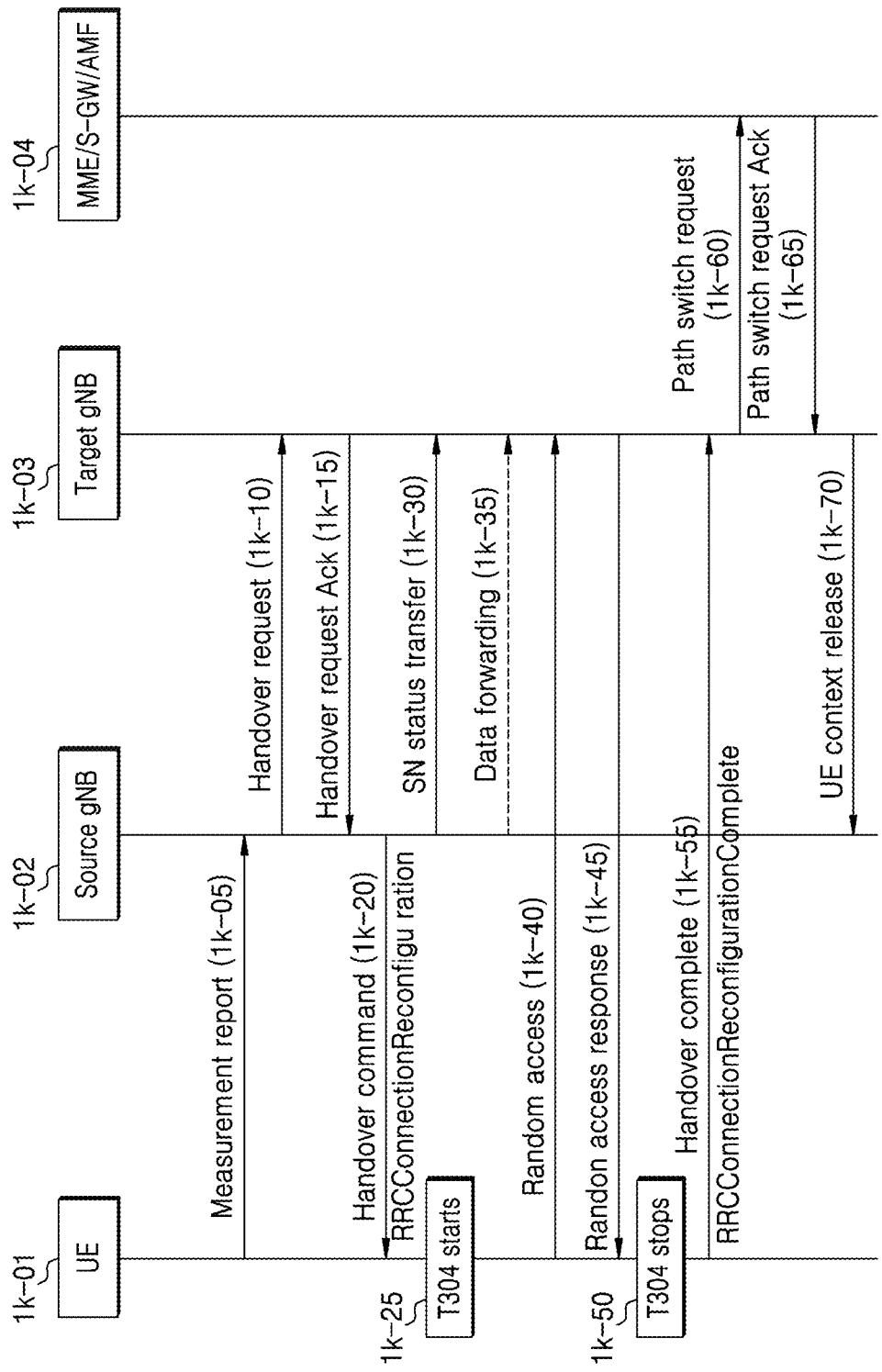
FIG. 1K illustrates a diagram for describing a handover process in a next-generation wireless communication system, according to an embodiment of the disclosure.

FIG. 1K illustrates a diagram for describing a handover process in a next-generation wireless communication system, according to an embodiment of the disclosure.

A UE 1k-01 in a connected mode state transmits cell measurement information (a measurement report) to a current source gNB 1k-02 when a periodic or specific event is satisfied (1k-05). The source gNB 1k-02 may determine whether the UE 1k-01 is to perform handover to an adjacent cell, based on the cell measurement information. The handover is a technique of changing the source gNB 1k-02 providing a service to the UE 1k-01 in the connected mode state to another gNB (or another cell in the same gNB).

When the source gNB 1k-02 determined the handover, the source gNB 1k-02 requests a new gNB, i.e., a target gNB 1k-03, providing a service to the UE 1k-01 for the handover by transmitting a handover (HO) request message (1k-10). When the target gNB 1k-03 accepts an HO request, the target gNB 1k-03 transmits an HO request Ack message to the source gNB 1k-02 (1k-15). Upon receiving the HO request Ack message, the source gNB 1k-02 transmits an HO command message to the UE 1k-01 (1k-20). The HO command message is transmitted from the source gNB 1k-02 to the UE 1k-01 by using an RRC Connection Reconfiguration message (1k-20). Upon receiving the HO command message, the UE 1k-01 stops exchanging data with the source gNB 1k-02 and starts a T304 timer. The T304 timer sets the UE 1k-01 to an original setting and to an RRC idle state when the handover of the UE 1k-01 to the target gNB 1k-03 does not succeed for a certain time. The source gNB 1k-02 transmits a SN state with respect to UL/DL data and transmits the DL data to the target gNB 1k-03 when there is the DL data (1k-30 and 1k-35). The UE 1k-01 attempts random access to a target cell instructed by the source gNB 1k-02 (1k-40). The UE 1k-01 attempts the random access to notify the target cell that the UE 1k-01 is moving via the handover and at the same time, to synchronize the UL. For the random access, the UE 1k-01 transmits, to the target gNB 1k-03, a preamble corresponding to a preamble ID provided from the source gNB 1k-02 or a preamble ID randomly selected. When a certain number of subframes are passed after the preamble is transmitted, the UE 1k-01 monitors whether a random access response (RAR) message is transmitted from the target gNB 1k-03. A time section where whether the RAR message is transmitted is monitored is referred to as a RAR window. For a certain time, when the RAR message is received (1k-45), the UE 1k-01 transmits RRCConnectionReconfigurationComplete message to the target gNB 1k-03 as an HO complete message (1k-55). Upon successfully receiving the RAR message from the target gNB 1k-03, the UE 1k-01 stops the T304 timer (1k-50). The target gNB 1k-03 requests an MME (or S-GW or AMF) 1k-04 to switch a path (1k-60 and 1k-65) so as to switch a path of bearers set in the source gNB 1k-02, and notifies the source gNB 1k-02 to release UE context of the UE 1k-01 (1k-70). Accordingly, the UE 1k-01 attempts to receive data from the target gNB 1k-03 from a point of time when the RAR window starts, and after receiving the RAR message, starts to transmit data to the target gNB 1k-03 while transmitting the RRCConnectionReconfigurationComplete message.

Figure 1L:
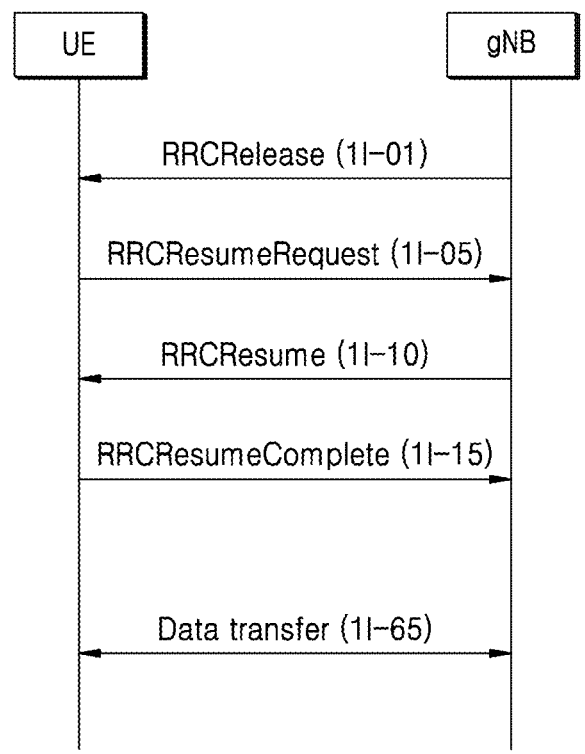
FIG. 1L illustrates a diagram for describing a procedure of resuming a connection by a UE in an RRC inactive mode, according to an embodiment of the disclosure.

FIG. 1L illustrates a diagram for describing a procedure of resuming a connection by a UE in an RRC inactive mode, according to an embodiment of the disclosure.

A gNB may transition the UE to the RRC inactive mode by transmitting an RRCRelease message including an indicator (suspend-config) to the UE to transition to the RRC inactive mode (1l-01). Upon receiving the RRCRelease message, the UE transitions to the RRC inactive mode, and then may perform an RRC connection resume procedure when it is required to establish a connection with a network due to a certain ground, for example, reception of a paging message, generation of UL data, or updating of a paging area.

During the RRC connection resume procedure, the UE may perform a random access procedure and transmit, to the gNB, an RRCResumeRequest message including a connection resume identifier via message 3 (1l-05). The gNB may receive the RRCResumeRequest message and identify the connection resume identifier of the UE. When the gNB is able to retrieve and confirm context of the UE, the gNB may transmit, to the UE, an RRCResume message via message 4 to allow resumption of connection (1l-10). The RRCResume message may include new configuration information for each service/bearer/RLC layer or for each logical channel or bearer, and may include information about whether to use ROHC for each bearer/logical channel, ROHC configuration information (for example, ROHC version or initial information), statusReportRequired information (information instructing UE for PDCP status report by gNB), and drb-ContinueROHC information (configuration information for maintaining and changelessly using ROHC configuration information and included and transmitted in PDCP layer configuration information (pdcp-config)).

When there is new configuration information in the received RRCResume message, the UE may update UE configuration by reflecting the new configuration information or when there is no new configuration information in the RRCResume message, the UE may use stored UE context. The UE that resumed the RRC connection may transmit an RRCResumeComplete message to the gNB (operation 1l-15). When the above processes are completed, the UE and the gNB may transmit and receive data (1l-65).

A first embodiment of the disclosure of an operation of a UE, in which header compression protocol configuration information of a PDCP layer for each bearer of the UE is used efficiently, is as follows.

When the UE received an RRCReconfiguration message indicating handover from a gNB
Or when the UE received an RRCResume message when performing an RRC connection resume procedure When an RRC message is received, the received RRC message includes UE configuration information, the UE configuration information indicates that a part of current UE configuration information is changed instead of the entire current UE configuration information (for example, entire configuration change indicator (fullconfig) is not included), and the received RRC message includes configuration information of adding or changing a data bearer, the UE may perform following operations with respect to each bearer identifier.

When a PDCP layer configuration (pdcp-config) is included with respect to the bearer identifier The UE may reconfigure a current PDCP layer of a bearer identifier with new PDCP layer configuration information received above.

When the PDCP layer configuration information includes header compression protocol configuration information continuous use indicator (drb-ContinueROHC)

The UE may indicate to a lower layer (PDCP layer) that the header compression protocol configuration information continuous use indicator (drb-ContinueROHC) is configured.

When the header compression protocol configuration information continuous use indicator (drb-ContinueROHC) is indicated or configured while the UE performs a PDCP layer reestablishment procedure A transmission PDCP layer may not initialize header compression protocol configuration information with respect to UM DRB and AM DRB.

A reception PDCP layer may not perform a header decompression procedure on stored PDCP layer data (for example, PDCP SDUs) with respect to AM DRB.

The reception PDCP layer may not initialize header decompression protocol configuration information with respect to UM DRB and AM DRB.

When the header compression protocol configuration information continuous use indicator (drb-ContinueROHC) is not indicated or not configured while the UE performs the PDCP layer reestablishment procedure The transmission PDCP layer may initialize the header compression protocol configuration information with respect to UM DRB and AM DRB.

The reception PDCP layer may perform the header decompression procedure on the stored PDCP layer data (for example, PDCP SDUs) based on current header decompression protocol configuration information, with respect to AM DRB. (When the header decompression protocol configuration information is initialized, stored data that is decompressed with only a previous header decompression protocol is unable to be decompressed later. Thus, the stored data may need to be decompressed with the current header decompression protocol before initializing the header decompression protocol configuration information.)

The reception PDCP layer may initialize the header decompression protocol configuration information with respect to UM DRB and AM DRB.

When the UE received an RRCResume message when performing an RRC connection resume procedure When the RRC message is received, the received RRC message includes the UE configuration information, and the UE configuration information indicates that a part of current UE configuration information is changed instead of the entire current UE configuration information (for example, entire configuration change indicator (fullconfig) is not included), the UE may perform following operations with respect to each bearer identifier.

The UE may reconstruct, from the stored UE context, master cell group information (PHY, MAC, or RLC layer configuration information) and the PDCP layer configuration information (pdcp-config). When the PDCP layer configuration information is reconstructed, the header compression protocol configuration information continuous use indicator (drb-ContinueROHC) may not be reconstructed. This is because the header compression protocol configuration information continuous use indicator (drb-ContinueROHC) is a one-time indicator that is applied whenever newly received and does not use a stored value.

A second embodiment of the disclosure of an operation of a UE, in which header compression protocol configuration information of a PDCP layer for each bearer of the UE is used efficiently, is as follows.

When the UE received an RRCReconfiguration message indicating handover from a gNB Or when the UE received an RRCResume message when performing an RRC connection resume procedure When an RRC message is received, the received RRC message includes UE configuration information, the UE configuration information indicates that a part of current UE configuration information is changed instead of the entire current UE configuration information (for example, entire configuration change indicator (fullconfig) is not included), and the received RRC message includes configuration information of adding or modifying a data bearer, the UE may perform following operations for each bearer identifier.

When a PDCP layer reestablishment procedure indication (reestablishPDCP) is included or configured (or set) for the bearer identifier When a PDCP layer configuration information is included and a header compression protocol configuration information continuous use indicator (drb-ContinueROHC) is included in the PDCP layer configuration information The UE may indicate to a lower layer (PDCP layer) that the header compression protocol configuration information continuous use indicator (drb-ContinueROHC) is configured.

The UE may perform the PDCP layer reestablishment procedure for the bearer identifier.

Also, when the header compression protocol configuration information continuous use indicator (drb-ContinueROHC) is indicated or configured while the UE performs a PDCP layer reestablishment procedure A transmission PDCP layer may not initialize header compression protocol configuration information for UM DRB and AM DRB.

A reception PDCP layer may not perform a header decompression procedure on stored PDCP layer data (for example, PDCP SDUs) for AM DRB.

The reception PDCP layer may not initialize header decompression protocol configuration information for UM DRB and AM DRB.

When the header compression protocol configuration information continuous use indicator (drb-ContinueROHC) is not indicated or not configured while the UE performs the PDCP layer reestablishment procedure The transmission PDCP layer may initialize the header compression protocol configuration information for UM DRB and AM DRB.

The reception PDCP layer may perform the header decompression procedure on the stored PDCP layer data (for example, PDCP SDUs) based on current header decompression protocol configuration information, for AM DRB. (When the header decompression protocol configuration information is initialized, stored data that is decompressed with only a previous header decompression protocol is unable to be decompressed later. Thus, the stored data may need to be decompressed with the current header decompression protocol before initializing the header decompression protocol configuration information.)

The reception PDCP layer may initialize the header decompression protocol configuration information for UM DRB and AM DRB.

When a PDCP layer configuration (pdcp-config) is included for the bearer identifier The UE may reconfigure a current PDCP layer of a bearer identifier with new PDCP layer configuration information received above.

When the UE received an RRCResume message when performing an RRC connection resume procedure When the RRC message is received, the received RRC message includes the UE configuration information, and the UE configuration information indicates that a part of current UE configuration information is changed instead of the entire current UE configuration information (for example, entire configuration change indicator (fullconfig) is not included), the UE may perform following operations for each bearer identifier.

The UE may reconstruct, from the stored UE context, master cell group information (PHY, MAC, or RLC layer configuration information) and the PDCP layer configuration information (pdcp-config). When the PDCP layer configuration information is reconstructed, the header compression protocol configuration information continuous use indicator (drb-ContinueROHC) may not be reconstructed. This is because the header compression protocol configuration information continuous use indicator (drb-ContinueROHC) is a one-time indicator that is applied whenever newly received and does not use a stored value.

A third embodiment of the disclosure of an operation of a UE, in which header compression protocol configuration information of a PDCP layer for each bearer of the UE is used efficiently, is as follows.

Operation of UE and Apparatus Related to UE PDCP Configuration and PDCP Operation 1. Receiving an RRC Setup message from a base station
2. Receiving the RRC setup message from the base station and configuring a PDCP apparatus of a first wireless bearer (SRB1)
3. Receiving an RRCReconfiguration message from the base station and configuring a PDCP apparatus of a second wireless bearer (SRB2) and a PDCP apparatus of a third wireless bearer (DRBs)
4. Transmitting and receiving PDCP PDU including an RRC control message through the first wireless bearer and the second wireless bearer, and transmitting and receiving PDCP PDU including an IP packet through the third wireless bearer to and from the base station
5. Applying a first operation (ciphering/deciphering) to the first wireless bearer and the second wireless bearer, and applying the first operation and a second operation (header compression) to the third wireless bearer
6. Receiving the RRCReconfiguration message including Reconfiguration WithSync from the base station
7. Applying a third operation (SDU discard, PDCP variable initialization) to the first wireless bearer and the second wireless bearer, and applying a fourth operation (PDCP reestablishment) and optionally a fifth operation (ROHC continue) to the third wireless bearer
A. The fifth operation is performed when a predetermined parameter (drb-ContinueROHC) is indicated via PDCP configuration information of the third wireless bearer The fifth operation is not performed when not indicated.
8. Receiving a RRCRelease message including SuspendConfig from the base station
9. Store following information in UE context
A. Entire PDCP configuration information of the first wireless bearer or at least a part of the PDCP configuration information of the first wireless bearer
B. Entire PDCP configuration information of the second wireless bearer or at least a part of the PDCP configuration information of the second wireless bearer
C. Among PDCP configuration information of the third wireless bearer, a first parameter set (PDCP-SN-Size, header compression configuration information, discardTimer, integrityProtection) is stored and a second parameter set (drb-continueROHC) is discarded (or the first and second parameter sets are all stored and only the first parameter set is applied in operation 12)
10. Perform an INACTIVE state operation
11. Transmit an RRCResumeRequest message to the base station. Reconstruct PDCP configuration of the first wireless bearer and resume an operation of the first wireless bearer
12. Receive an RRCResume message from the base station Reconstruct PDCP configuration of the second wireless bearer and resume an operation of the second wireless bearer Reconstruct PDCP configuration by applying remaining configuration information excluding the second parameter set among PDCP configuration of the third wireless bearer Resume an operation of the third wireless bearer
A. Only one of the first wireless bearer and the second wireless bearer is configured
B. A plurality of third wireless bearers are configurable
C. PDCP configuration information for the first wireless bearer and the second wireless bearer is a third parameter set (UL-DataSplitThreshold)
D. PDCP configuration information for the third wireless bearer is the first parameter set and the second parameter set
E. The first parameter set is a parameter set that is effective in both a first event and a second event.
F. The second parameter set is a parameter set that is effective in the first event and not effective in the second event.
G. The first event is an event receiving an RRC control message including a predetermined parameter set The second event is an event receiving a predetermined RRC control message not including a parameter by the UE storing a predetermined parameter obtained via an RRC control message received previously.

Figure 1M:
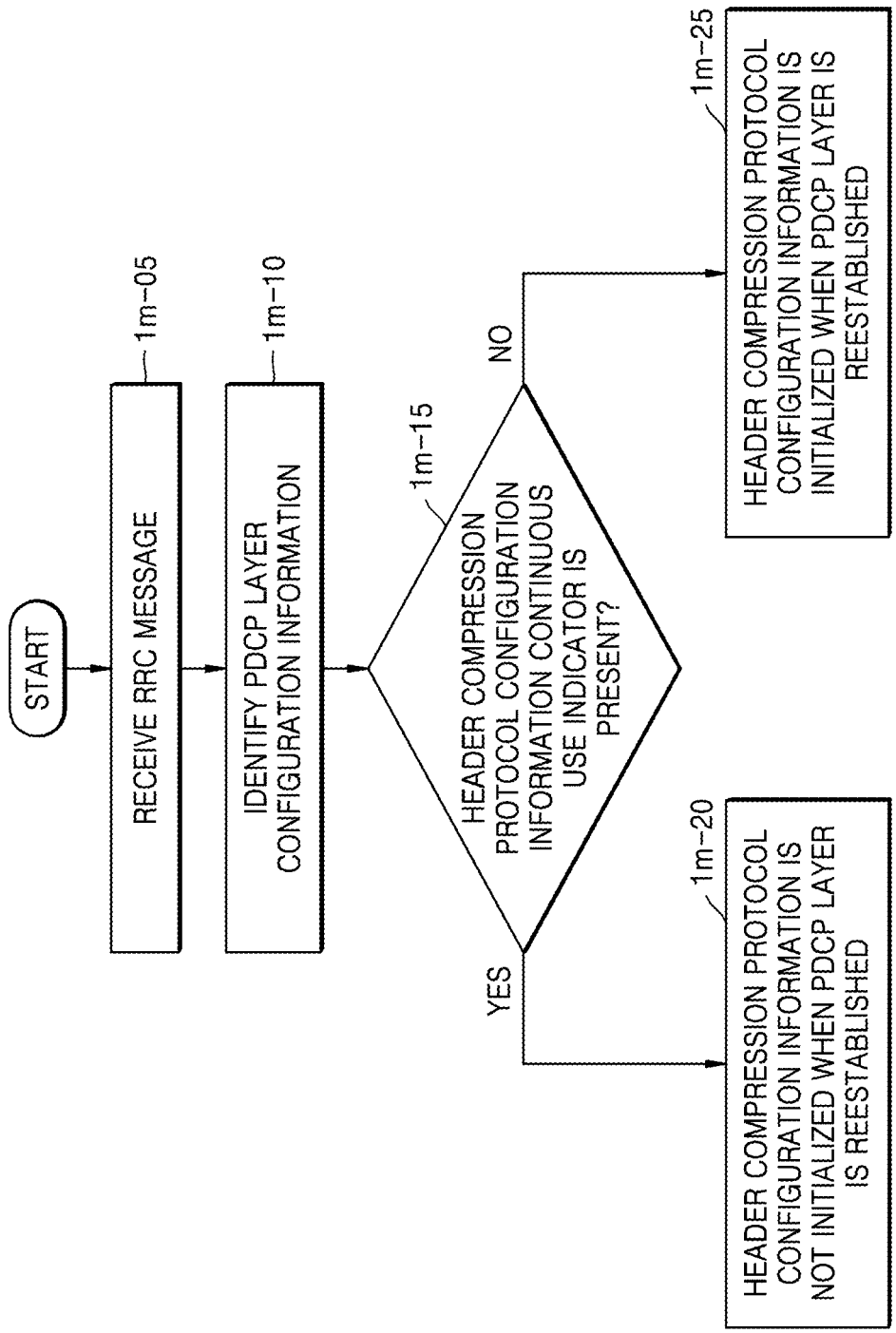
FIG. 1M illustrates a diagram of operations of a UE, according to an embodiment of the disclosure.

FIG. 1M illustrates a diagram of operations of a UE, according to an embodiment of the disclosure.

The UE may receive an RRC message from a base station during handover or RRC connection resumption (1m-05). The UE may identify whether PDCP layer configuration information is included in the received RRC message for each bearer (1m-10), and when the PDCP layer configuration information is present for a bearer, the UE may identify whether a header compression protocol configuration information continuous use indicator is included in the PDCP layer configuration information (1m-15). It may be identified which one of SRB1, SRB2, and DRB is configured for each bearer through the RRC message. The RRC message may be at least one of an RRCConnectionReconfiguration message, an RRC setup message, or an RRCResumeRequest message.

When the header compression protocol configuration information continuous use indicator is included in the PDCP layer configuration information (1m-15) or according to another embodiment of the disclosure, when the header compression protocol configuration information continuous use indicator is set to 1 in the PDCP layer configuration information, the UE does not initialize header compression protocol configuration information when a PDCP layer corresponding to the bearer is reestablished (1m-20). The identifying of the header compression protocol configuration information continuous use indicator may reflect a type of the bearer identified via the RRC message.

When the header compression protocol configuration information continuous use indicator is not included in the PDCP layer configuration information (1m-15) or according to another embodiment of the disclosure, when the header compression protocol configuration information continuous use indicator is set to 0 in the PDCP layer configuration information, the UE may initialize header compression protocol configuration information when a PDCP layer corresponding to the bearer is reestablished (1m-25). The identifying of the header compression protocol configuration information continuous use indicator may reflect a type of the bearer identified via the RRC message.

Figure 1N:
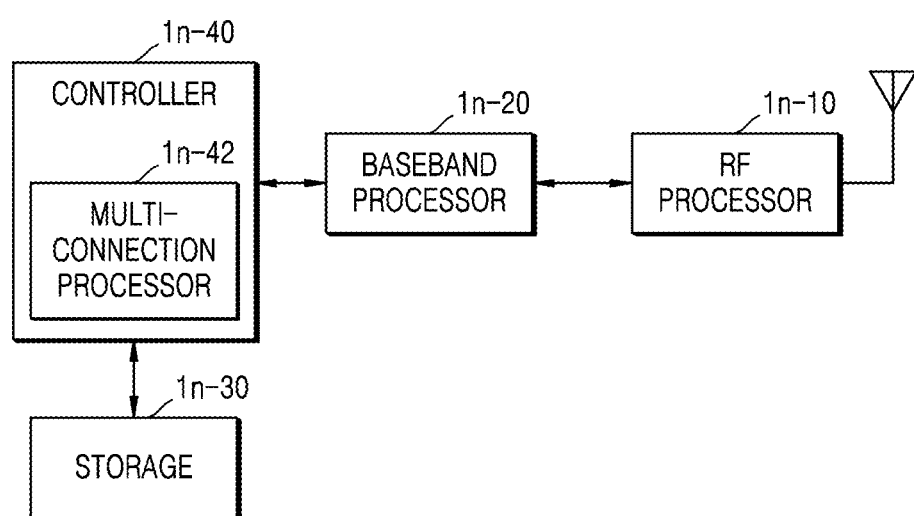
FIG. 1N illustrates a diagram of a structure of a UE, according to an embodiment of the disclosure.
Figure 10:
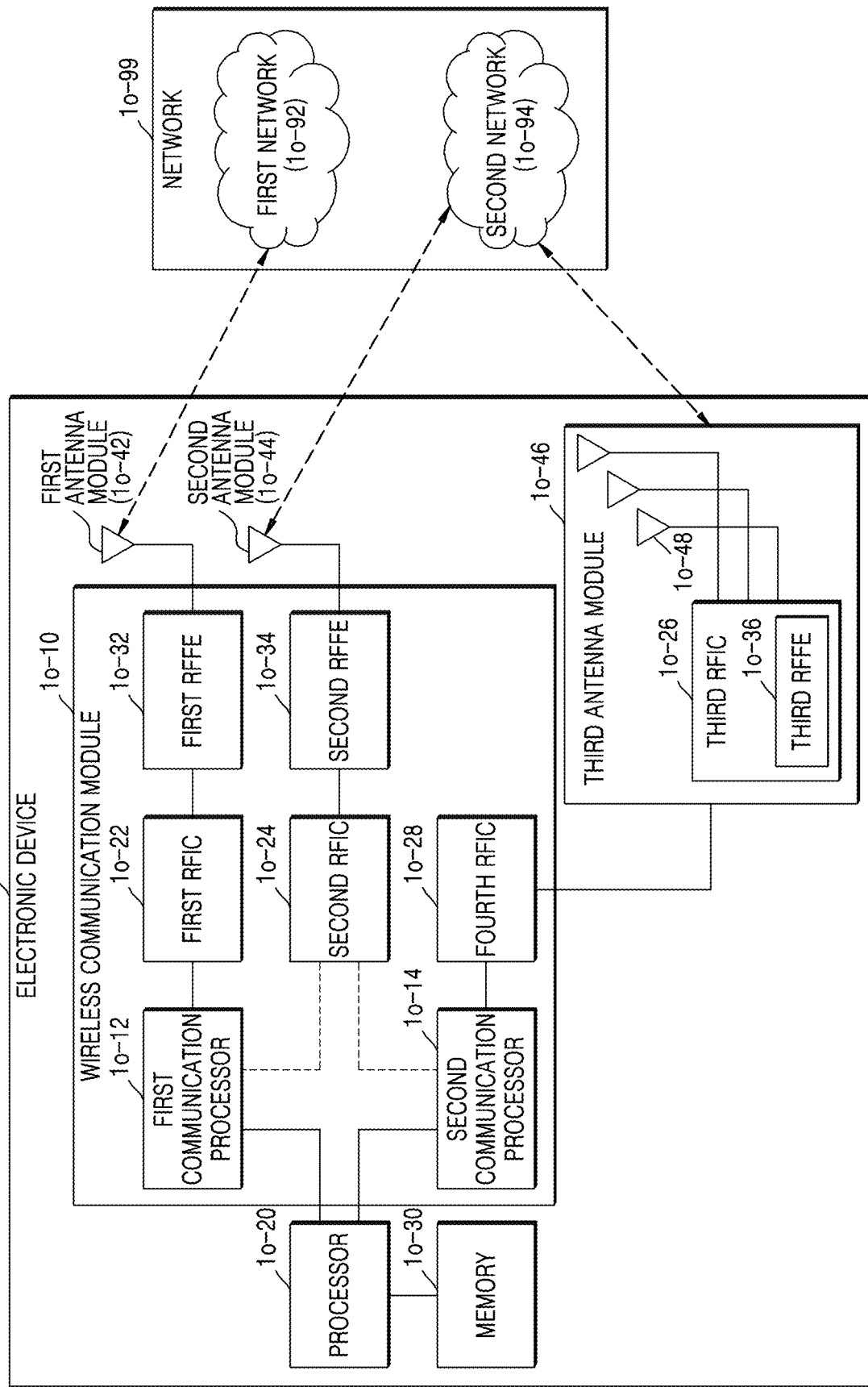

FIG. 1N illustrates a diagram of a structure of a UE, according to an embodiment of the disclosure.

Referring to FIG. 1N, the UE includes a radio frequency (RF) processor 1n-10, a baseband processor 1n-20, a storage 1n-30, and a controller 1n-40. However, the UE is not limited thereto and may include more or less components than those shown in FIG. 1N.

The RF processor 1n-10 may perform functions for transmitting and receiving signals through radio channels, e.g., signal band conversion and amplification. That is, the RF processor 1n-10 up-converts a baseband signal provided from the baseband processor 1n-20, to an RF band signal and transmit the RF band signal through an antenna, and down-converts an RF band signal received through an antenna, to a baseband signal. For example, the RF processor 1n-10 may include a transmit filter, a receive filter, an amplifier, a mixer, an oscillator, a digital-to-analog converter (DAC), and an analog-to-digital converter (ADC). Although only a single antenna is illustrated in FIG. 1N, the UE may include multiple antennas. The RF processor 1n-10 may include a plurality of RF chains. The RF processor 1n-10 may perform beamforming. For beamforming, the RF processor 1n-10 may adjust phases and amplitudes of signals transmitted or received through multiple antennas or antenna elements. The RF processor 1n-10 may perform multiple input multiple output (MIMO) and may receive data of multiple layers in the MIMO operation. The RF processor 1n-10 may perform received beam sweeping by appropriately configuring multiple antennas or antenna elements, or adjust a direction and a beam width of the received beam to coordinate with a transmit beam, under the control of the controller 1n-40.

The baseband processor 1n-20 may convert between a baseband signal and a bitstream based on physical layer specifications of a system. For example, for data transmission, the baseband processor 1n-20 generates complex symbols by encoding and modulating a transmit bitstream. For data reception, the baseband processor 1n-20 may reconstruct a received bitstream by demodulating and decoding a baseband signal provided from the RF processor 1n-10. For example, according to an OFDM scheme, for data transmission, the baseband processor 1n-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 1n-20 may split a baseband signal provided from the RF processor 1n-10, in OFDM symbol units, reconstruct signals mapped to subcarriers by performing fast Fourier transformation (FFT), and then reconstruct a received bitstream by demodulating and decoding the signals.

The baseband processor 1n-20 and the RF processor 1n-10 transmit and receive signals as described above. As such, each of the baseband processor 1n-20 and the RF processor 1n-10 may also be called a transmitter, a receiver, a transceiver, or a communicator. At least one of the baseband processor 1n-20 or the RF processor 1n-10 may include multiple communication modules to support multiple different radio access technologies. Also, at least one of the baseband processor 1n-20 or the RF processor 1n-10 may include multiple communication modules to process signals of different frequency bands. For example, the different radio access technologies may include an LTE network, NR network, etc. The different frequency bands may include an SHF (e.g., 2.5 GHz and 5 GHZ) band and a mmWave (e.g., 60 GHZ) band. The UE may transmit or receive a signal to or from a base station by using the baseband processor 1n-20 and the RF processor 1n-10, and the signal may include control information and data.

The storage 1n-30 may store data for operation of the UE, e.g., basic programs, application programs, and configuration information. The storage 1n-30 may provide the stored data upon request by the controller 1n-40. The storage 1n-30 may be configured in a storage medium, such as ROM, RAM, a hard disk, CD-ROM, or DVD, or a combination thereof. Also, the storage 1n-30 may be configured in a plurality of memories.

The controller 1n-40 may control overall operations of the UE. For example, the controller 1n-40 may transmit and receive signals through the baseband processor 1n-20 and the RF processor 1n-10. The controller 1n-40 may record and read data on and from the storage 1n-30. In this regard, the controller 1n-40 may include at least one processor. For example, the controller 1n-40 may include a communication processor (CP) for controlling communications and an application processor (AP) for controlling an upper layer such as an application program. Also, the controller 1n-40 may include multi-connection processor 1n-42. Also, at least one component in the UE may be embodied in one chip.

FIG. 1O illustrates a diagram showing a structure of an electronic device 1o-01 for supporting legacy network communication and 5G network communication, according to an embodiment of the disclosure.

Referring to FIG. 1O, the electronic device 1o-01 may include a first communication processor 1o-12, a second communication processor 1o-14, a first radio frequency integrated circuit (RFIC) 1o-22, a second RFIC 1o-24, a third RFIC 1o-26, a fourth RFIC 1o-28, a first radio frequency front end (RFFE) 1o-32, a second RFFE 1o-34, a first antenna module 1o-42, a second antenna module 1o-44, and an antenna 1o-48. The electronic device 1o-01 may further include a processor 1o-20 and a memory 1o-30. A network 1o-99 may include a first network 1o-92 and a second network 1o-94. According to another embodiment of the disclosure, the electronic device 1o-01 may further include at least one component among those shown in FIG. 1O and the network 1o-99 may further include at least one other network. According to an embodiment of the disclosure, the first communication processor 1o-12, the second communication processor 1o-14, the first RFIC 1o-22, the second RFIC 1o-24, the fourth RFIC 1o-28, the first RFFE 1o-32, and the second RFFE 1o-34 may form at least a part of a wireless communication module 1o-10. According to another embodiment of the disclosure, the fourth RFIC 1o-28 may be omitted or may be included as a part of the third RFIC 1o-26.

The first communication processor 1o-12 may support establishment of a communication channel of a band to be used for wireless communication with the first network 1o-92, and legacy network communication through the established communication channel. According to various embodiments of the disclosure, the first network 1o-92 may be a legacy network including a 2G, 3G, 4G, or LTE network. The second communication processor 1o-14 may support establishment of a communication channel corresponding to a band (e.g., about 6 GHz to about 60 GHZ) assigned among bands to be used for wireless communication with the second network 1o-94, and 5G network communication through the established communication channel. According to various embodiments of the disclosure, the second network 1o-94 may be a 5G network defined by 3GPP. In addition, according to an embodiment of the disclosure, the first communication processor 1o-12 or the second communication processor 1o-14 may support establishment of a communication channel corresponding to another band (e.g., about 6 GHz or lower) assigned among bands to be used for wireless communication with the second network 1o-94, and 5G network communication through the established communication channel. According to an embodiment of the disclosure, the first communication processor 1o-12 and the second communication processor 1o-14 may be implemented in a single chip or a single package. According to various embodiments of the disclosure, the first communication processor 1o-12 or the second communication processor 1o-14 may be implemented in a single chip or a single package with the processor 1o-20, an auxiliary processor, or a communication module.

The first RFIC 1o-22 may convert a baseband signal generated by the first communication processor 1o-12 into an RF signal of about 700 MHz to about 3 GHz used for the first network 1o-92 (for example, a legacy network), during transmission. During reception, the RF signal may be obtained from the first network 1o-92 (for example, a legacy network) through an antenna (for example, the first antenna module 1o-42), and preprocessed through an RFFE (for example, the first RFFE 1o-32). The first RFIC 1o-22 may convert the preprocessed RF signal into a baseband signal to be processed by the first communication processor 1o-12.

The second RFIC 1o-24 may convert a baseband signal generated by the first communication processor 1o-12 or the second communication processor 1o-14 into an RF signal (hereinafter, referred to as a 5G Sub6 RF signal) of a Sub6 band (for example, about 6 GHz or lower) used for the second network 1o-94 (for example, a 5G network), during transmission. During reception, the 5G Sub6 RF signal may be obtained from the second network 1o-94 (for example, a 5G network) through an antenna (for example, the second antenna module 1o-44), and preprocessed through an RFFE (for example, the second RFFE 1o-34). The second RFIC 1o-24 may convert the preprocessed 5G Sub6 RF signal into a baseband signal to be processed by a communication processor corresponding to the first communication processor 1o-12 or the second communication processor 1o-14.

The third RFIC 1o-26 may convert a baseband signal generated by the second communication processor 1o-14 into an RF signal (hereinafter, referred to as a 5G Above6 RF signal) of a 5G Above6 band (for example, about 6 GHz to about 60 GHZ) to be used for the second network 1o-94 (for example, a 5G network), during transmission. During reception, the 5G Above6 RF signal may be obtained from the second network 1o-94 (for example, a 5G network) through an antenna (for example, the antenna 1o-48), and preprocessed through a third RFFE 1o-36. The third RFIC 1o-26 may convert the preprocessed 5G Above6 RF signal into a baseband signal to be processed by the second communication processor 1o-14. According to an embodiment of the disclosure, the third RFFE 1o-36 may be configured as a part of the third RFIC 1o-26.

According to an embodiment of the disclosure, the electronic device 1o-01 may include the fourth RFIC 1o-28 separately from or as a part of the third RFIC 1o-26. In this case, the fourth RFIC 1o-28 may convert the baseband signal generated by the second communication processor 1o-14 into an RF signal (hereinafter, referred to as an intermediate frequency (IF) signal) of an IF band (for example, about 9 GHz to about 11 GHZ), and transmit the IF signal to the third RFIC 1o-26. The third RFIC 1o-26 may convert the IF signal into a 5G Above6 RF signal. During reception, the 5G Above6 RF signal may be received from the second network 1o-94 (for example, a 5G network) through an antenna (for example, the antenna 1o-48) and converted into the IF signal by the third RFIC 1o-26. The fourth RFIC 1o-28 may convert the IF signal into a baseband signal to be processed by the second communication processor 1o-14.

According to an embodiment of the disclosure, the first RFIC 1o-22 and the second RFIC 1o-24 may be implemented as at least a part of a single chip or a single package. According to an embodiment of the disclosure, the first RFFE 1o-32 and the second RFFE 1o-34 may be implemented as at least a part of a single chip or a single package. According to an embodiment of the disclosure, at least one of the first antenna module 1o-42 or the second antenna module 1o-44 may be omitted or may be combined with another antenna module to process RF signals of a plurality of corresponding bands.

According to an embodiment of the disclosure, the third RFIC 1o-26 and the antenna 1o-48 may be arranged on the same substrate to configure a third antenna module 1o-46. For example, the wireless communication module 1o-10 or the processor 1o-20 may be arranged on a first substrate (for example, a main printed circuit board (PCB)). In this case, the third RFIC 1o-26 may be arranged on a partial region (for example, a bottom surface) of a second substrate (for example, a sub PCB) different from the first substrate, and the antenna 1o-48 may be arranged on another partial region (for example, a top surface) thereof to form the third antenna module 1o-46. According to an embodiment of the disclosure, the antenna 1o-48 may include, for example, an antenna array used for beamforming. By arranging the third RFIC 1o-26 and the antenna 1o-48 on the same substrate, the length of a transmission path therebetween may be reduced. Thus, for example, the loss (for example, attenuation) of a signal of a high frequency band (for example, about 6 GHz to about 60 GHZ) used for 5G network communication caused by the transmission path may be prevented. Accordingly, the communication quality or speed between the electronic device 1o-01 and the second network 1o-94 (for example, a 5G network) may be increased.

The second network 1o-94 (for example, a 5G network) may be operated independently from (for example, standalone (SA)) or in connection with (for example, non-stand alone (NSA)) the first network 1o-92 (for example, a legacy network). For example, a 5G network may include only an access network (for example, a 5G radio access network (RAN) or a next generation RAN (NG RAN)) and not include a core network (for example, a next generation core (NGC)). In this case, the electronic device 1o-01 may access an access network of the 5G network and access an external network (for example, the Internet) under control of a core network (for example, an evolved packed core (EPC)) of the legacy network. Protocol information (for example, LTE protocol information) for communication with the legacy network) and protocol information (for example, new radio (NR) protocol information) for communication with the 5G network may be stored in the memory 1o-30 and accessed by another component (for example, the processor 1o-20, the first communication processor 1o-12, or the second communication processor 1o-14).

Figure 1P:
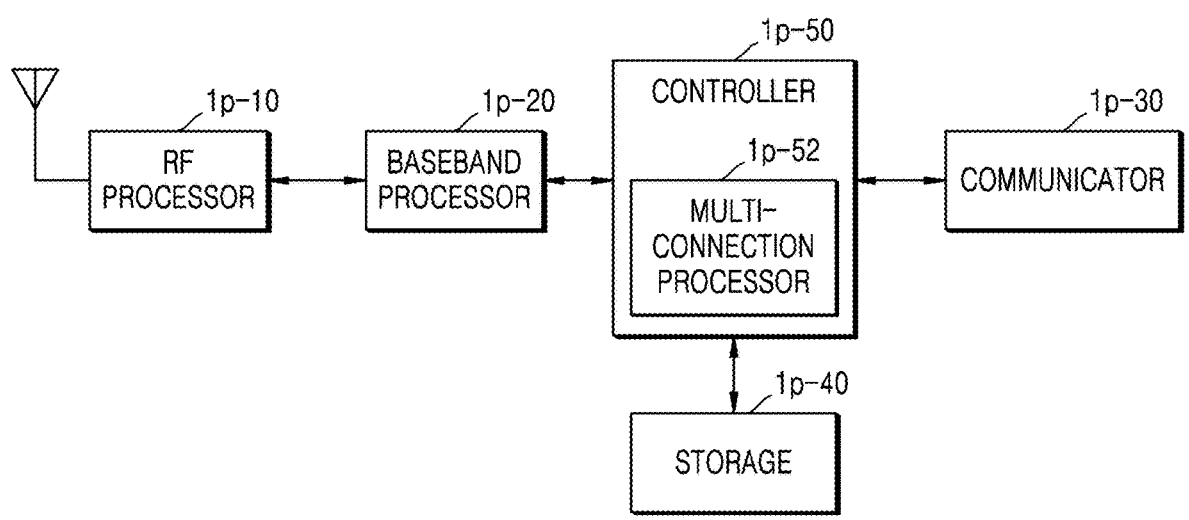
FIG. 1P illustrates a block diagram of a structure of a base station in a wireless communication system, according to an embodiment of the disclosure.

FIG. 1P illustrates a block diagram of a structure of a base station in a wireless communication system, according to an embodiment of the disclosure.

Referring to FIG. 1P, a base station may include an RF processor 1p-10, a baseband processor 1p-20, a communicator 1p-30, a storage 1p-40, and a controller 1p-50. However, the base station is not limited thereto and may include more or less components than those shown in FIG. 1P.

The RF processor 1p-10 may perform functions for transmitting and receiving signals through radio channels, e.g., signal band conversion and amplification. That is, the RF processor 1p-10 up-converts a baseband signal provided from the baseband processor 1p-20, to an RF band signal and transmit the RF band signal through an antenna, and down-converts an RF band signal received through an antenna, to a baseband signal. For example, the RF processor 1p-10 may include a transmit filter, a receive filter, an amplifier, a mixer, an oscillator, a DAC, and an ADC. Although only a single antenna is illustrated in FIG. 1P, the RF processor 1p-10 may include a plurality of antennas. The RF processor 1p-10 may include a plurality of RF chains. In addition, the RF processor 1p-10 may perform beamforming. For beamforming, the RF processor 1p-10 may adjust phases and amplitudes of signals transmitted or received through multiple antennas or antenna elements. The RF processor 1p-10 may perform DL MIMO by transmitting data of two or more layers.

The baseband processor 1p-20 may convert between a baseband signal and a bitstream based on physical layer specifications of a first radio access technology. For example, for data transmission, the baseband processor 1p-20 may generate complex symbols by encoding and modulating a transmit bitstream. For data reception, the baseband processor 1p-20 reconstructs a received bitstream by demodulating and decoding a baseband signal provided from the RF processor 1p-10. For example, according to an OFDM scheme, for data transmission, the baseband processor 1p-20 generates complex symbols by encoding and modulating a transmit bitstream, maps the complex symbols to subcarriers, and then configures OFDM symbols by performing IFFT and CP insertion. For data reception, the baseband processor 1p-20 may split a baseband signal provided from the RF processor 1p-10, in OFDM symbol units, reconstruct signals mapped to subcarriers by performing FFT, and then reconstruct a received bitstream by demodulating and decoding the signals. The baseband processor 1p-20 and the RF processor 1p-10 may transmit and receive signals as described above. As such, each of the baseband processor 1p-20 and the RF processor 1p-10 may also be called a transmitter, a receiver, a transceiver, a communicator, or a wireless communicator. The base station may transmit or receive a signal to or from a UE by using the baseband processor 1p-20 and the RF processor 1p-10, and the signal may include control information and data.

The communicator 1p-30 may provide an interface for communicating with other nodes in a network. According to some embodiments of the disclosure, the communicator 1p-30 may be a backhaul communicator.

The storage 1p-40 may store data for operation of the base station described above, e.g., basic programs, application programs, and configuration information. In particular, the storage 1p-40 may store information about bearers allocated for a connected UE, a measurement report transmitted from the connected UE, etc. The storage 1p-40 may store criteria information used to determine whether to provide or release multi-connection to or from the UE. The storage 1p-40 may provide the stored data upon request by the controller 1p-50. The storage 1p-40 may be configured in a storage medium, such as ROM, RAM, a hard disk, CD-ROM, or DVD, or a combination thereof. Also, the storage 1p-40 may be configured in a plurality of memories.

The controller 1p-50 may control overall operations of the base station. For example, the controller 1p-50 may transmit and receive signals through the baseband processor 1p-20 and the RF processor 1p-10 or through the communicator 1p-30. Also, the controller 1p-50 may include multi-connection processor 1p-42. The controller 1p-50 may record and read data on and from the storage 1p-40. In this regard, the controller 1p-50 may include at least one processor. Also, at least one component in the base station may be embodied in one chip.

In a next-generation wireless communication system, base stations having various radio access technologies may be arranged complexly. For example, a UMTS (3G) base station, an LTE base station connected to an EPC (LTE core network), or an NR (5G) base station connected to a 5GC (NR or 5G core network) may provide a service to a UE. When performing handover between the various radio access technologies, the UE needs to reset all pieces of configuration information of a PHY layer, an MAC layer, an RLC layer, or a PDCP layer suitable for different radio access technologies. Thus, when the base station indicates the handover, overhead of each layer configuration information of each bearer (PHY layer, MAC layer, RLC layer, or PDCP layer) of the UE also increases, and the UE needs to clear all pieces of the configuration information and reset the configuration information.

According to the disclosure, in the next-generation wireless communication system in which the base stations supporting the different radio access technologies provide a service to the UE, a method of maintaining and changelessly using configuration information common between the different radio access technologies when the base station instructs the UE of handover between different radio access technologies (inter-RAT handover) is proposed. In particular, according to some embodiments of the disclosure, the base stations may define and use an indicator (for example, fullConfig) of instructing the UE whether to release all pieces of currently configured bearer configuration information and newly configure the bearer configuration information or to store information commonly used by a source base station and a target base station without releasing the information. According to some embodiments of the disclosure, the indicator may be a newly defined indicator or may be an indicator previously used.

As described above, by instructing the UE to store and reuse the configuration information common between the source base station and the target base station during handover between the different radio access technologies, unnecessary overhead and unnecessary operation of the UE may be reduced.

Hereinafter, a specific instruction of a base station and a specific base station operation and UE operation corresponding thereto, according to embodiments of the disclosure, will be described.

Figure 2A:
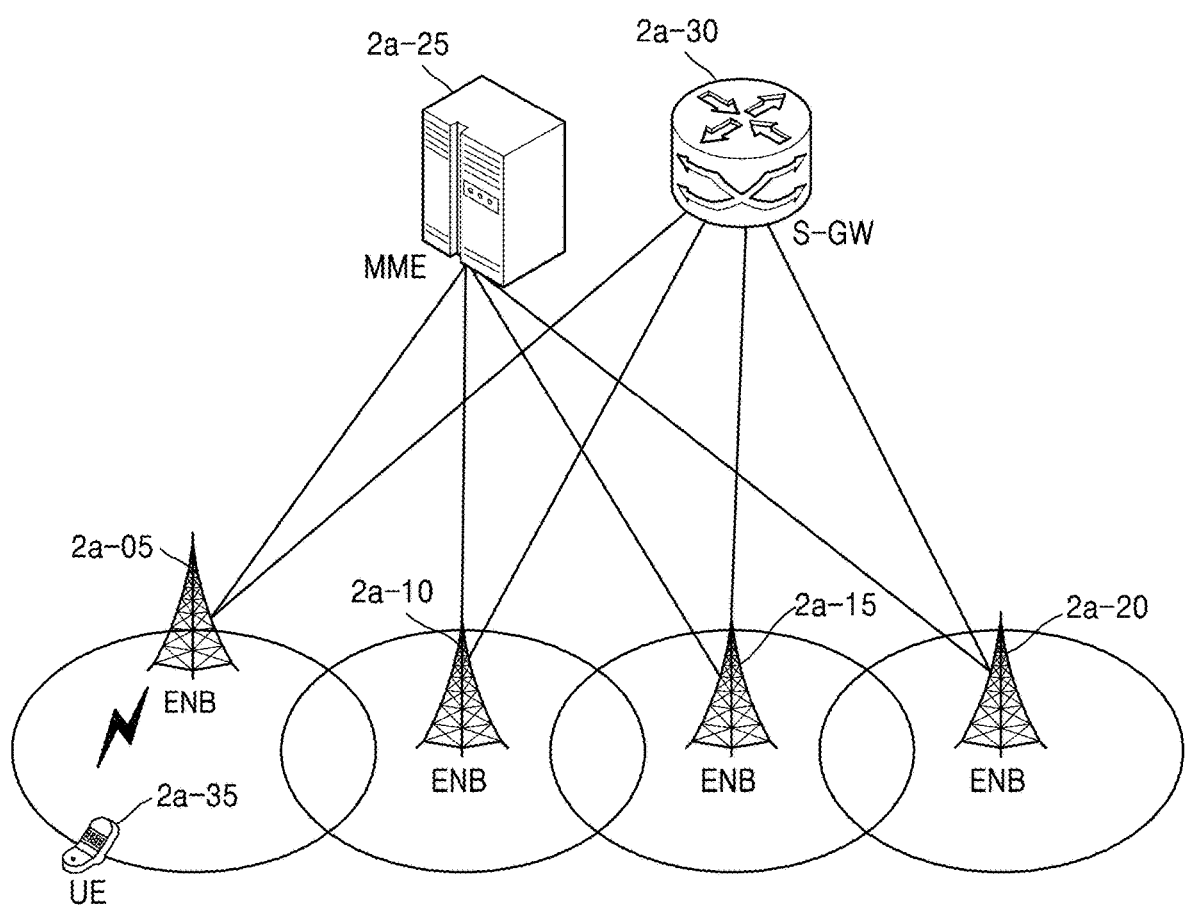
FIG. 2A illustrates a diagram of a structure of an LTE system, according to an embodiment of the disclosure.

FIG. 2A illustrates a diagram of a structure of an LTE system, according to an embodiment of the disclosure.

Referring to FIG. 2A, a RAN of the LTE system may include eNBs, NBs, or base stations 2a-05, 2a-10, 2a-15, and 2a-20, a MME2 2a-25, and an S-GW 2a-30. A UE or a terminal 2a-35 may access an external network via the eNB 2a-05, 2a-10, 2a-15, or 2a-20 and the S-GW 2a-30.

In FIG. 2A, each of the eNBs 2a-05, 2a-10, 2a-15, and 2a-20 may correspond to an existing NB of a UMTS. The eNB 2a-05, 2a-10, 2a-15, or 2a-20 may be connected to the UE 2a-35 through a radio channel and may perform complex functions compared to the existing NB. Because all user traffic data including real-time services such as VOIP is serviced through shared channels in the LTE system, an entity for collating buffer status information of UEs, available transmission power status information, channel status information, etc. and performing scheduling is required and each of the eNBs 2a-05, 2a-10, 2a-15, and 2a-20 serves as such an entity. A single eNB may generally control multiple cells. For example, the LTE system may use radio access technology such as orthogonal frequency division multiplexing (OFDM) at a bandwidth of 20 MHz to achieve a data rate of 100 Mbps. The LTE system may also use AMC to determine a modulation scheme and a channel coding rate in accordance with a channel status of the UE 2a-35. The S-GW 2a-30 is an entity for providing data bearers and may configure or release the data bearers under the control of the MME 2a-25. The MME 2a-25 is an entity for performing a mobility management function and various control functions for the UE 2a-35 and may be connected to the eNBs 2a-05, 2a-10, 2a-15, and 2a-20.

Figure 2B:
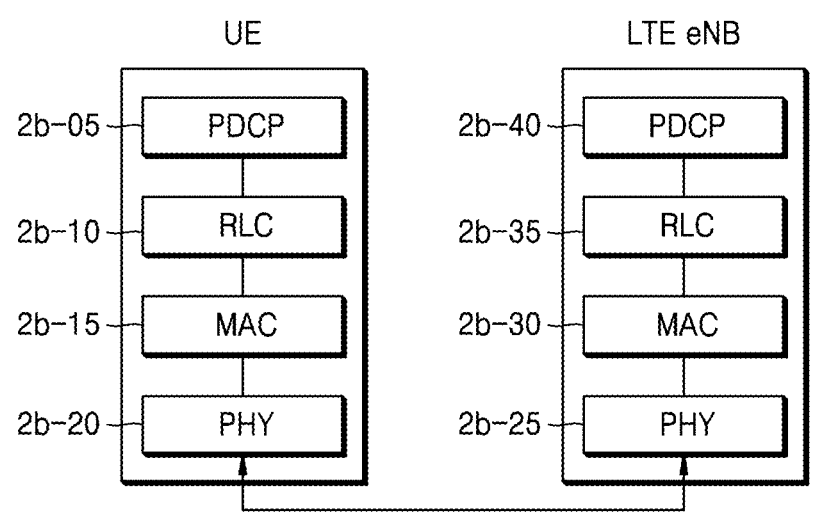
FIG. 2B illustrates a diagram of a radio protocol architecture in an LTE system, according to an embodiment of the disclosure.

FIG. 2B illustrates a diagram of a radio protocol architecture in an LTE system, according to an embodiment of the disclosure.

Referring to FIG. 2B, the radio protocol architecture of the LTE system may include PDCP layers 2b-05 and 2b-40, RLC layers 2b-10 and 2b-35, and MAC layers 2b-15 and 2b-30 respectively for a UE and an eNB. The PDCP layer 2b-05 or 2b-40 is in charge of IP header compression/decompression, etc. Main functions of the PDCP layer 2b-05 or 2b-40 may be summarized as below.

Header compression and decompression: ROHC only
    Transfer of user data
    In-sequence delivery of upper layer PDUs at PDCP re-establishment procedure for RLC AM
    For split bearers in DC (only support for RLC AM): PDCP PDU routing for transmission and PDCP PDU reordering for reception
    Duplicate detection of lower layer SDUs at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The RLC layer 2b-10 or 2b-35 may perform, for example, an ARQ operation by reconfiguring PDCP PDUs to appropriate sizes. Main functions of the RLC layer 1b-10 or 1b-35 may be summarized as below.

Transfer of upper layer PDUs
    Error Correction through ARQ (only for AM data transfer)
    Concatenation, segmentation, and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MAC layer 2b-15 or 2b-30 is connected to multiple RLC layers configured for a single UE and may multiplex RLC PDUs into a MAC PDU and demultiplex the RLC PDUs from the MAC PDU. Main functions of the MAC layer 2b-15 or 2b-30 may be summarized as below.

Mapping between logical channels and transport channels
    Multiplexing/demultiplexing of MAC SDUs belonging to one or different logical channels into/from TB delivered to/from the physical layer on transport channels
    Scheduling information reporting
    Error correction through HARQ
    Priority handling between logical channels of one UE
    Priority handling between UEs by means of dynamic scheduling
    MBMS service identification
    Transport format selection
    Padding A PHY layer 2b-20 or 2b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 2C:
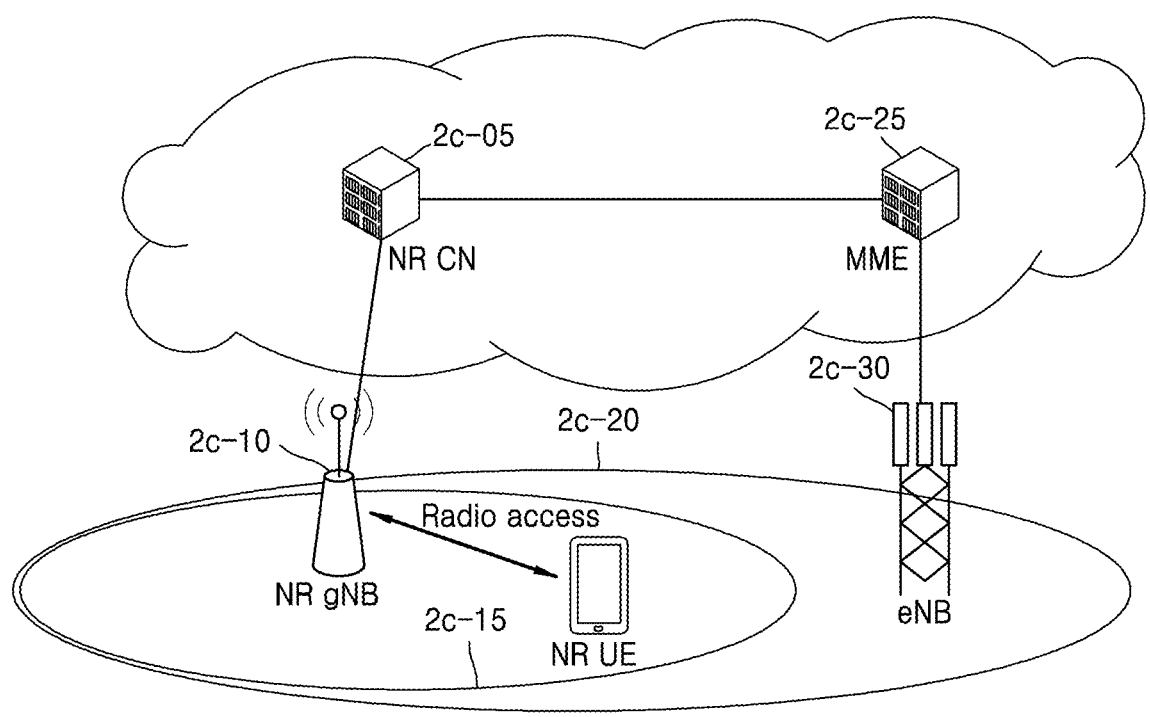
FIG. 2C illustrates a diagram of a structure of a next-generation wireless communication system, according to an embodiment of the disclosure.

FIG. 2C illustrates a diagram of a structure of a next-generation wireless communication system, according to an embodiment of the disclosure;

Referring to FIG. 2C, a RAN of the next-generation wireless communication system (e.g., an NR or 5G system) may include an NR NB or NR gNB 2c-10 and an NR CN or an NR CN 2c-05. An NR UE or UE 2c-15 may access an external network via the NR gNB 2c-10 and the NR CN 2c-05.

In FIG. 2C, the NR gNB 2c-10 may correspond to an eNB of an existing LTE system. The NR gNB 2c-10 is connected to the NR UE 2c-15 through radio channels and may provide superior services compared to an existing NB. Because all user traffic data is serviced through shared channels in the next-generation wireless communication system, an entity for collating buffer status information of UEs, available transmission power status information, channel status information, etc. and performing scheduling is required and such operations may be performed by the NR gNB 2c-10. A single NR gNB 2c-10 may control multiple cells. In the next-generation wireless communication system, a bandwidth greater than the maximum bandwidth of LTE may be given to achieve a current ultrahigh data rate, and beamforming technology may be additionally used with OFDM as radio access technology.

The next-generation wireless communication system may also use AMC to determine a modulation scheme and a channel coding rate in accordance with a channel status of the NR UE 2a-15. The NR CN 2c-05 may perform functions such as mobility support, bearer setup, and QoS setup. The NR CN 2c-05 is an entity for performing a mobility management function and various control functions for the UE 1c-15 and may be connected to multiple NR gNBs 2c-10. The next generation wireless communication system may cooperate with the existing LTE system, and the NR CN 2c-05 may be connected to an MME 2c-25 through a network interface. The MME 2c-25 may be connected to an existing eNB 2c-30.

Referring to FIG. 2C, a situation in which a macrocell and picocell coexist may be considered. The macrocell is a cell controlled by a macro base station and may provide a service in a relatively wide area. On the other hand, the picocell is a cell controlled by a secondary base station, SeNB, or SgNB, and provides a service in a significantly small area compared to a general macrocell. There is no strict criterion for distinguishing the macrocell and the picocell, but for example, an area of the macrocell may be about 500 m in radius and an area of the picocell may be about tens of meters in radius. According to embodiments of the disclosure, a cell may include the picocell and the macrocell. In this case, the macrocell may be an LTE base station (MeNB) or an NR base station (MgNB), and the picocell may be an NR base station (SgNB) or an LTE base station (SeNB). In particular, a 5G base station supporting the picocell may use a frequency band equal to or greater than 6 GHZ.

In embodiments of the disclosure, a situation in which the macrocells coexist may be considered. The macrocell is a cell controlled by a macro base station and may provide a service in a relatively wide area. In this case, the macrocell may include an LTE base station (MeNB) and an LTE base station (SeNB). According to another embodiment of the disclosure, the macrocell may include an LTE base station (MeNB) and an NR base station (SgNB). According to another embodiment of the disclosure, the macrocell may include an NR base station (MgNB) and an LTE base station (SeNB). According to another embodiment of the disclosure, the macrocell may include an NR base station (MgNB) and an NR base station (SgNB).

Figure 2D:
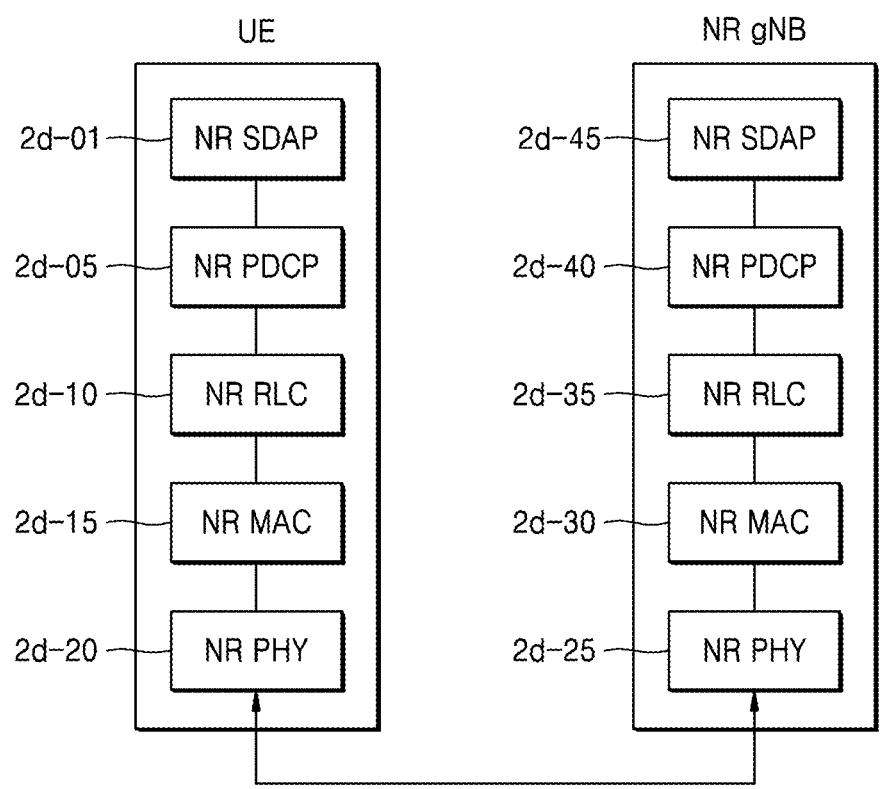
FIG. 2D illustrates a diagram of a radio protocol architecture of a next-generation wireless communication system, according to an embodiment of the disclosure.

FIG. 2D illustrates a diagram of a radio protocol architecture of a next-generation wireless communication system, according to an embodiment of the disclosure;

Referring to FIG. 2D, the radio protocol architecture of the next-generation wireless communication system includes NR SDAP layers 2d-01 and 2d-45, NR PDCP layers 2d-05 and 2d-40, NR RLC layers 2d-10 and 2d-35, and NR MAC layers 2d-15 and 2d-30, respectively for a UE and an NR gNB.

Main functions of the NR SDAP layers 2d-01 and 2d-45 may include some of the following functions.
　　Transfer of user plane data
　　Mapping between QoS flow and a data radio bearer (DRB) for both DL and UL
　　Marking QoS flow ID in both DL and UL packets
　　Reflective QoS flow to DRB mapping for the UL SDAP PDUs For an SDAP layer, the UE may receive, via an RRC message, settings on whether to use a header of the SDAP layer or use a function of the SDAP layer for each PDCP layer, bearer, or logical channel. When an SDAP header is set, the UE may instruct a non-access stratum (NAS) reflective QoS 1-bit indicator and an access stratum (AS) reflective QoS 1-bit indicator of the SDAP header to update or reset mapping information regarding the data bearer and the QoS flow of UL and DL. The SDAP header may include QoS flow ID indicating QoS. QoS information may be used as data processing priority information, scheduling information, etc. for supporting a smooth service.

Main functions of the NR PDCP layer 2d-05 or 2d-40 may include some of the following functions.
　　Header compression and decompression: ROHC only
　　Transfer of user data
　　In-sequence delivery of upper layer PDUs
　　Out-of-sequence delivery of upper layer PDUs
　　PDCP PDU reordering for reception
　　Duplicate detection of lower layer SDUs
　　Retransmission of PDCP SDUs
　　Ciphering and deciphering
　　Timer-based SDU discard in uplink A reordering function (PDCP PDU reordering for reception) of the NR PDCP layer 2d-05 or 2d-40 may include denote a function of reordering PDCP PDUs received from a lower layer, based on a PDCP sequence number (SN). The reordering function (PDCP PDU reordering for reception) of the NR PDCP layer 2d-05 or 2d-40 may include a function of delivering the reordered data to an upper layer in order, a function of immediately delivering the reordered data without considering an order, a function of recording missing PDCP PDUs by reordering the PDCP PDUs, a function of reporting status information of the missing PDCP PDUs to a transmitter, and a function of requesting to retransmit the missing PDCP PDUs.

The main functions of the NR RLC layer 2d-10 or 2d-35 may include at least some of the following functions.
　　Transfer of upper layer PDUs
　　In-sequence delivery of upper layer PDUs
　　Out-of-sequence delivery of upper layer PDUs
　　Error correction through ARQ
　　Concatenation, segmentation and reassembly of RLC SDUs
　　Re-segmentation of RLC data PDUs
　　Reordering of RLC data PDUs
　　Duplicate detection
　　Protocol error detection
　　RLC SDU discard
　　RLC re-establishment The in-sequence delivery function of the NR RLC layer 2d-10 or 2d-35 may denote a function of delivering RLC SDUs received from a lower layer, to an upper layer in order. The in-sequence delivery function of the NR RLC layer 2d-10 or 2d-35 may include a function of reassembling multiple RLC SDUs segmented from an RLC SDU and delivering the RLC SDU when the segmented RLC SDUs are received, a function of reordering received RLC PDUs on an RLC SN or PDCP SN basis, a function of recording missing RLC PDUs by reordering the RLC PDUs, a function of reporting status information of the missing RLC PDUs to a transmitter, a function of requesting to retransmit the missing RLC PDUs, a function of delivering only RLC SDUs previous to a missing RLC SDU, to the upper layer in order, when the missing RLC SDU exists, a function of delivering all RLC SDUs received before a timer is started, to the upper layer in order, although a missing RLC SDU exists, when a certain timer is expired, and a function of delivering all RLC SDUs received up to a current time, to the upper layer in order, although a missing RLC SDU exists, when a certain timer is expired. Further, the NR RLC layer 2d-10 or 2d-35 may process the RLC PDUs in order of reception (in order of arrival regardless of sequence numbers) and deliver the RLC PDUs to a PDCP entity out of order (out-of sequence delivery), and reassemble segments received or stored in a buffer, into a whole RLC PDU and process and deliver the RLC PDU to the PDCP layer. The NR RLC layer 2d-10 or 2d-35 may not have a concatenation function, and the concatenation function may be performed by the NR MAC layer 2d-15 or 2d-30 or be replaced with a multiplexing function of the NR MAC layer 2d-15 or 2d-30.

Out-of-sequence delivery of the NR RLC layer 2d-10 or 2d-35 may denote a function of delivering RLC SDUs received from a lower layer, immediately to an upper layer out of an order. The out-of-sequence delivery function of the NR RLC layer 2d-10 or 2d-35 may include a function of reassembling multiple RLC SDUs segmented from an RLC SDU and delivering the RLC SDU when the segmented RLC SDUs are received and a function of storing RLC SNs or PDCP SNs of received RLC PDUs and recording missing RLC PDUs by ordering the RLC PDUs.

The NR MAC layer 2d-15 or 2d-30 may be connected to multiple NR RLC layers 2d-10 or 2d-35 configured for a single UE, and main functions of the NR MAC layer 2d-15 or 2d-30 may include at least some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding A PHY layer 2d-20 or 2d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 2E:
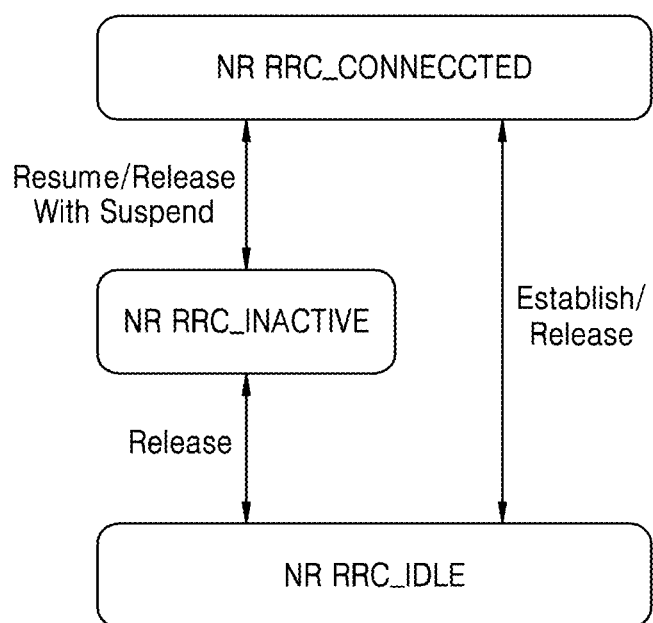
FIG. 2E illustrates a diagram showing a RRC mode of a UE belonging to a next-generation wireless communication system, and transition relationship between modes, according to an embodiment of the disclosure.

FIG. 2E illustrates a diagram showing a RRC mode of a UE belonging to a next-generation wireless communication system, and transition relationship between modes, according to an embodiment of the disclosure. Features of each RRC mode of the UE are as follows.

RRC_IDLE:

The UE may perform a DRX operation according to a configuration related to the DRX operation configured by an upper layer.

The UE may perform the inter-cell movement based on the base station configuration.

The UE may monitor a SMS by using P-RNTI transmitted from DCI. Also, the UE may monitor a paging channel for a core network-based paging signal by using 5G-S-TMSI.

Also, the UE may perform the measurement or re(selection) process regarding the neighboring cell. Also, the UE may receive system information or, when supported, request the base station to transmit the system information.

RRC_INACTIVE:

The UE may perform the DRX operation according to the setting related to the DRX operation from the upper layer or an RRC layer.

The UE may perform the inter-cell movement based on the base station configuration.

The UE may store UE inactive AS context.

The UE may be configured with respect to an RAN-based notification area by the RRC layer.

The UE may transmit or receive unicast data.

The UE may monitor the SMS by using P-RNTI transmitted from DCI, according to configuration. Also, the UE may monitor the paging channel for the core network-based paging signal by using 5G-S-TMSI and for an RAN-based paging signal using full-RNTI. Also, the UE may perform the measurement or re(selection) process regarding the neighboring cell. Also, the UE may perform an RAN-based notification area update process periodically or when outside the RAN-based notification area. Also, the UE may receive the system information or, when supported, request the base station to transmit the system information.

RRC_CONNECTED:

The UE may store the AS context.

The UE may transmit or receive unicast data.

The UE may operate according to DRX set by the base station, in a lower layer.

The UE supporting CA may simultaneously use at least one Scell or SpCell.

The UE supporting DC may simultaneously use at least one SCG or MCG.

The UE may perform inter-cell movement in NR or between NR-LTE according to indication of the base station. Alternatively, the UE may perform inter-cell movement in NR or between NR-LTE according to determination of the UE based on the base station configuration.

The UE may monitor the SMS by using P-RNTI transmitted from DCI. The UE may monitor a control channel to determine whether there is scheduled data. The UE may perform channel measurement and transmit a measurement result to the base station. Also, the UE may perform the measurement or re(selection) process regarding the neighboring cell. Also, the UE may receive the system information.

Figure 2F:
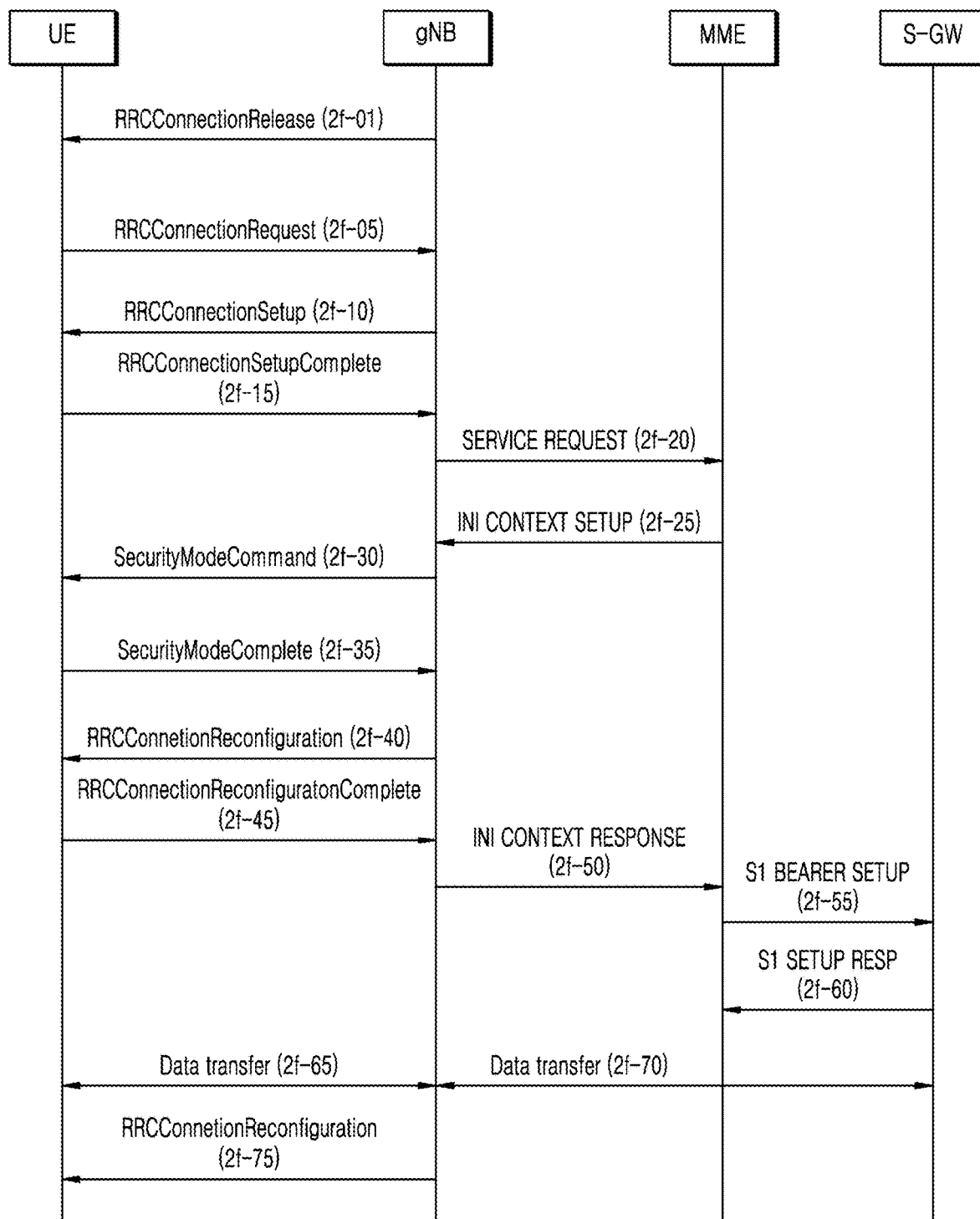
FIG. 2F illustrates a diagram for describing procedures of a UE establishing a connection with a network by switching from an RRC idle mode or RRC inactive mode to an RRC connected mode, according to an embodiment of the disclosure.

FIG. 2F illustrates a diagram for describing procedures of a UE establishing a connection with a network by switching from an RRC idle mode to an RRC connected mode, according to an embodiment of the disclosure.

Referring to FIG. 2F, when the UE that transmits or receives data in the RRC connected mode does not transmit or receive data for a certain reason or for a certain time, a gNB may transmit an RRCConnectionRelease message to the UE to switch to the RRC idle mode (operation 2f-01). Thereafter, when data to be transmitted is generated, the UE that has not currently established a connection (hereinafter, the idle mode UE) may perform an RRC connection establishment procedure with the gNB. The UE may establish reverse transmission synchronization with the gNB through a random access procedure and transmit an RRCConnectionRequest message to the gNB (operation 2f-05). The RRCConnectionRequest message may include an identifier of the UE, establishment cause, or the like.

The gNB may transmit an RRCConnectionSetup message such that the UE establishes an RRC connection (operation 2f-10). The RRCConnectionSetup message may include configuration information for each service/bearer/RLC layer or for each logical channel or bearer, and may include information about whether to use ROHC for each bearer/logical channel, ROHC configuration information (for example, ROHC version or initial information), statusReportRequired information (information instructing UE for PDCP status report by gNB), and drb-ContinueROHC information (configuration information for maintaining and changelessly using ROHC configuration information and included and transmitted in PDCP layer configuration information (pdcp-config)). Also, the RRCConnectionSetup message may include RRC connection configuration information or the like. A bearer for RRC connection is also referred to as an SRB and may be used during transmission and reception of an RRC message that is a control message between the UE and the gNB.

The UE that established the RRC connection may transmit an RRCConnectionSetupComplete message to the gNB (operation 2f-15). The RRCConnectionSetupComplete message may include a control message such as a SERVICE REQUEST message for requesting an MME to configure a bearer for a certain service by the UE. The gNB may transmit the SERVICE REQUEST message included in the RRCConnectionSetupComplete message to the MME (operation 2f-20), and the MME may determine whether to provide the service requested by the UE. As a result of the determination, when the service requested by the UE is to be provided, the MME may transmit an INITIAL CONTEXT SETUP REQUEST message to the gNB (operation 2f-25). The INITIAL CONTEXT SETUP REQUEST message may include QoS information to be applied in configuring a DRB, security information (e.g., a security key, a security algorithm, or the like) to be applied to the DRB, or the like. The gNB may exchange a SecurityModeCommand message (operation 2f-30) and a SecurityModeComplete message (operation 2f-35) with the UE to configure a security mode. After the security mode is configured, the gNB may transmit an RRCConnectionReconfiguration message to the UE (operation 2f-40).

The RRCConnectionReconfiguration message may include configuration information for each service/bearer/RLC layer or for each logical channel or bearer, and may include information about whether to use ROHC for each bearer/logical channel, ROHC configuration information (for example, ROHC version or initial information), statusReportRequired information (information instructing UE for PDCP status report by gNB), and drb-ContinueROHC information (configuration information for maintaining and changelessly using ROHC configuration information and included and transmitted in PDCP layer configuration information (pdcp-config)). Also, the RRCConnectionReconfiguration message may include RRC connection configuration information or the like. A bearer for RRC connection is also referred to as an SRB and may be used during transmission and reception of an RRC message that is a control message between the UE and the gNB. [Table 2] below is an example of PDCP configuration information included in an RRC Connection Reconfiguration message.

TABLE 2

```
PDCP-Config ::=                 SEQUENCE {
    drb                         SEQUENCE {
        discardTimer            ENUMERATED {ms10, ms20, ms30, ms40, ms50, ms60, ms75,
ms100, ms150, ms200,
                                ms250, ms300, ms500, ms750, ms1500, infinity}
        pdcp-SN-SizeUL          ENUMERATED {len12bits, len18bits}
        pdcp-SN-SizeDL          ENUMERATED {len12bits, len18bits} headerCompression
CHOICE {
            notUsed             NULL,
            rohc                SEQUENCE {
                maxCID          INTEGER (1..16383)          DEFAULT 15,
                profiles        SEQUENCE {
                    profile0x0001   BOOLEAN,
                    profile0x0002   BOOLEAN,
                    profile0x0003   BOOLEAN,
                    profile0x0004   BOOLEAN,
                    profile0x0006   BOOLEAN,
                    profile0x0101   BOOLEAN,
                    profile0x0102   BOOLEAN,
                    profile0x0103   BOOLEAN,
                    profile0x0104   BOOLEAN
                },
                drb-ContinueROHC    ENUMERATED { true }    OPTIONAL   -- Need N
            },
            uplinkOnlyROHC      SEQUENCE {
                maxCID          INTEGER (1..16383)          DEFAULT 15,
                profiles        SEQUENCE {
                    profile0x0006   BOOLEAN
                },
                drb-ContinueROHC    ENUMERATED { true }    OPTIONAL   -- Need N
            },
            ...
        },
        integrityProtection     ENUMERATED { enabled }
        statusReportRequired    ENUMERATED { true }
        outOfOrderDelivery      ENUMERATED { true }
    }                                                       OPTIONAL,
    moreThanOneRLC              SEQUENCE {
        primaryPath             SEQUENCE {
            cellGroup           CellGroupId     OPTIONAL,   -- Need R logicalChannel      LogicalChannelIdentity   OPTIONAL   -- Need R
```

TABLE 2-continued

```
  },
  ul-DataSplitThreshold        UL-DataSplitThreshold    OPTIONAL,
  pdcp-Duplication             BOOLEAN        OPTIONAL  -- Need R
  }                                           OPTIONAL,
  ...,
}
UL-DataSplitThreshold ::= ENUMERATED {
   b0, b100, b200, b400, b800, b1600, b3200, b6400, b12800, b25600, b51200, b102400, b204800,
   b409600, b819200, b1228800, b1638400, b2457600, b3276800, b4096000, b4915200, b5734400,
   b6553600, infinity, spare8, spare7, spare6, spare5, spare4, spare3, spare2, spare1}
```

Also, the RRCConnectionReconfiguration message may include configuration information about the DRB to process user data, and the UE may configure the DRB by using the configuration information and transmit an RRCConnectionReconfigurationComplete message to the gNB (operation 2f-45). Upon completing the DRB configuration with the UE, the gNB transmits an INITIAL CONTEXT SETUP COMPLETE message to the MME (operation 2f-50), and upon reception, the MME may exchange an S1 BEARER SETUP message and an S1 BEARER SETUP RESPONSE message with an S-GW to configure an S1 bearer (operations 2f-55 and 2f-60). The S1 bearer is a connection for data transmission, which is configured between the S-GW and the gNB, and may correspond to the DRB in a one-to-one manner. After the above procedures are completed, the UE may transmit or receive data to or from the gNB through the S-GW in operations 2f-65 and 2f-70. As such, general data transmission processes may largely include three steps of RRC connection establishment, security setting, and DRB configuration. Also, the gNB may transmit, to the UE, an RRCConnectionReconfiguration message to renew, add, or change the configuration for a certain reason (2f-75).

Also, the RRCConnectionReconfiguration message may include an indicator (for example, fullConfig) instructing the UE of whether to release entire configuration information (for example, bearer configuration information) and configure new entire configuration information or to newly configure only some pieces of UE information (for example, configuration information of an RLC layer, MAC layer, or PHY layer) among current configuration information. For example, when the indicator is included in the RRCConnectionReconfiguration message, the UE may release the entire bearer configuration information and newly configure the entire UE configuration information based on received configuration information. When the indicator is not included in the RRCConnectionReconfiguration message, the UE may store the entire or some information (for example, configuration information of a PDCP layer or SDAP layer) among existing UE information and update newly configured configuration information as a part of the current UE configuration information.

In the disclosure, a bearer may denote an SRB and a DRB, wherein SRB stands for a signaling radio bearer and the DRB stands for a data radio bearer. The SRB may be used to transmit and receive the RRC message of the RRC layer, and the DRB may be mainly used to transmit and receive user layer data. Also, a UM DRB may denote a DRB using an RLC layer operating in a UM, and an AM DRB may denote a DRB using an RLC layer operating in an AM.

Figure 2G:
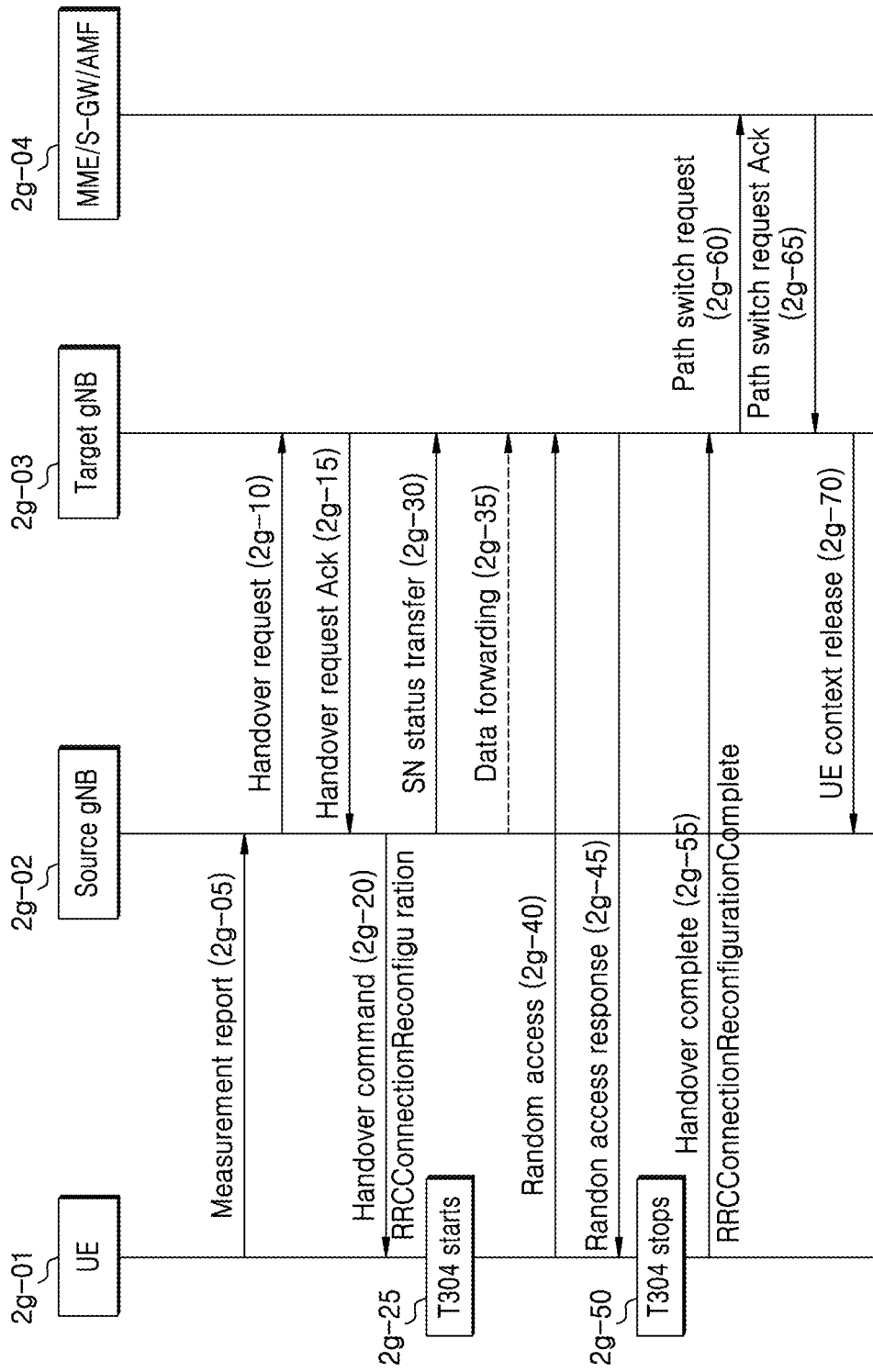
FIG. 2G illustrates a diagram for describing a handover process in a next-generation wireless communication system, according to an embodiment of the disclosure.

FIG. 2G illustrates a diagram for describing a handover process in a next-generation wireless communication system, according to an embodiment of the disclosure.

A UE 2g-01 in a connected mode state transmits cell measurement information (a measurement report) to a current source gNB 2g-02 when a periodic or specific event is satisfied (2g-05). The source gNB 2g-02 may determine whether the UE 2g-01 is to perform handover to an adjacent cell, based on the cell measurement information. The handover is a technique of changing the source gNB 2g-02 providing a service to the UE 2g-01 in the connected mode state to another gNB (or another cell in the same gNB).

When the source gNB 2g-02 determined the handover, the source gNB 2g-02 requests a new gNB, i.e., a target gNB 2g-03, providing a service to the UE 2g-01 for the handover by transmitting a handover (HO) request message (2g-10). When the target gNB 2g-03 accepts an HO request, the target gNB 2g-03 transmits an HO request Ack message to the source gNB 2g-02 (2g-15). Upon receiving the HO request Ack message, the source gNB 2g-02 transmits an HO command message to the UE 2g-01 (2g-20). The HO command message is transmitted from the source gNB 2g-02 to the UE 2g-01 by using an RRCConnectionReconfiguration message (2g-20). Upon receiving the HO command message, the UE 2g-01 stops exchanging data with the source gNB 2g-02 and starts a T304 timer. The T304 timer sets the UE 2g-01 to an original setting and to an RRC idle state when the handover of the UE 2g-01 to the target gNB 2g-03 does not succeed for a certain time. The source gNB 2g-02 transmits a sequence number (SN) state with respect to uplink/downlink data and transmits the downlink data to the target gNB 2g-03 when there is the downlink data (2g-30 and 2g-35). The UE 2g-01 attempts random access to a target cell instructed by the source gNB 2g-02 (2g-40). The UE 2g-01 attempts the random access to notify the target cell that the UE 2g-01 is moving via the handover and at the same time, to synchronize the uplink. For the random access, the UE 2g-01 transmits, to the target gNB 2g-03, a preamble corresponding to a preamble ID provided from the source gNB 2g-02 or a preamble ID randomly selected. When a certain number of subframes are passed after the preamble is transmitted, the UE 2g-01 monitors whether an RAR message is transmitted from the target gNB 2g-03. A time section where whether the RAR message is transmitted is monitored is referred to as a RAR window. For a certain time, when the RAR message is received (2g-45), the UE 2g-01 transmits RRCConnectionReconfigurationComplete message to the target gNB 2g-03 as an HO complete message (2g-55). Upon successfully receiving the RAR message from the target gNB 2g-03, the UE 2g-01 stops the T304 timer (2g-50). The target eNB 2g-03 requests an MME (or S-GW or AMF) 2g-04 to switch a path (2g-60 and 2g-65) so as to switch a path of bearers set in the source gNB 2g-02, and notifies the source gNB 2g-02 to release UE context of the UE 2g-01 (2g-70). Accordingly, the UE 2g-01 attempts to receive data from the target gNB 2g-03 from a point of time when the RAR window starts, and after receiving the RAR message, starts to transmit data to the target gNB 2g-03 while transmitting the RRCConnectionReconfiguration-Complete message.

Figure 2H:
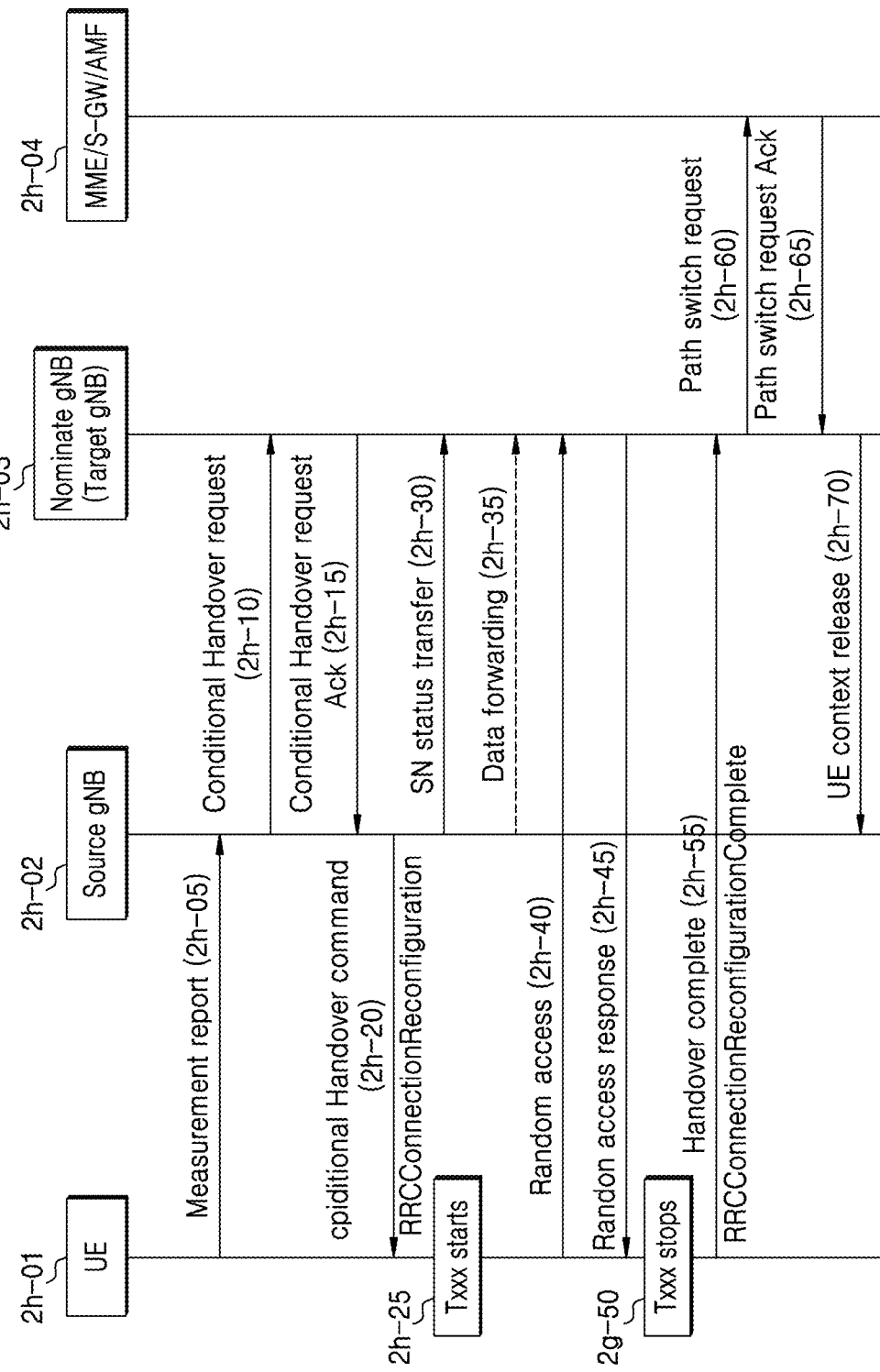
FIG. 2H illustrates a diagram for describing a conditional handover process in a next-generation wireless communication system, according to an embodiment of the disclosure.

FIG. 2H illustrates a diagram for describing a conditional handover process in a next-generation wireless communication system, according to an embodiment of the disclosure, A UE 2h-01 in a connected mode state transmits cell measurement information (a measurement report) to a current source gNB 2h-02 when a periodic or specific event is satisfied (2h-05). Also, the source eNB 2h-02 determines at least one nominate gNB where the UE 2h-01 is able to perform handover on an adjacent cell, based on measurement information. Conditional handover is a technique in which an gNB provides a condition for performing handover and the UE 2h-01 performing the handover determines a time point, while the source gNB 2h-02 providing a service to the UE 2h-01 in a connected mode is changed to another gNB (or another cell of the same gNB).

When the source eNB 2h-02 determined at least one eNB regarding the handover, the source eNB 2h-02 requests conditional handover by transmitting a conditional handover (CHO) request message to at least one nominate gNB or target gNB 2h-03 providing a service to the UE 2h-01 (2h-10). When the target gNB 2h-03 accepts a conditional handover request, the target gNB 2h-03 transmits a CHO request acknowledgement message to the source gNB 2h-02 (2h-15). Upon receiving the CHO request acknowledgement message, the source gNB 2h-02 transmits a CHO command message to the UE 2h-01. The CHO command message is transmitted from the source gNB 2h-02 to the UE 2h-01 by using an RRCConnectionReconfiguration message (2h-20). The CHO command may include at least one of a time during which a corresponding message is valid (Txxx timer expiration time), at least one nominate gNB information (for example, at least one of frequency information or gNB identification (ID)), or a condition for performing handover (for example, a condition related to a channel state with the source gNB 2h-02) or a condition related to a channel state of at least one nominate gNB). Upon receiving the CHO command message, the UE 2h-01 starts a Txxx timer, measures at least one of a channel state with the source gNB 2h-02 or a channel state with a nominate gNB, and compares the measured channel state with a condition received from the source gNB 2h-02. When the UE 2h-01 does not perform handover on the target gNB 2h-03 for a certain period of time of the Txxx timer, the UE 2h-01 releases the CHO command received from the source gNB 2h-02. The source gNB 2h-02 may transmit an SN state with respect to UL/DL data and transmit the DL data to the target gNB 2h-03 when there is the DL data (2h-30 and 2h-35).

When the UE 2h-01 determines that handover needs to be performed on one gNB among nominate gNBs, based on a condition received from the source gNB 2h-02, the UE 2h-01 attempts a random access indicated by the source gNB 2h-02 on the one gNB (target cell) among the nominate gNBs. The random access is performed to notify the target cell that the UE 2h-01 is moving via handover and at the same time, to adjust UL synchronization. For the random access, the UE 2h-01 transmits, to the target cell, a preamble corresponding to a preamble ID provided from the source gNB 2h-02 or a randomly selected preamble ID. When a certain number of subframes are passed after the preamble is transmitted, the UE 2h-01 monitors whether a random access response (RAR) message is transmitted from the target cell. A monitoring time section is referred to as a RAR window. For a certain time, when the RAR message is received (2h-45), the UE 2h-01 transmits a RRCConnectionReconfigurationComplete message to the target gNB 2h-03 as an HO complete message (2h-55). As described above, upon successfully receiving the RAR message from the target gNB 2h-03, the UE 2h-01 stops a T304 timer (2h-50).

The target gNB 2h-03 requests path modification to modify paths of bearers set in the source gNB 2h-02 (2h-60 and 2h-65), and notifies the source gNB 2h-02 to release UE context of the UE 2h-01 (2h-70). Accordingly, the UE 2h-01 attempts to receive data from the target gNB 2h-03 from a point of time when the RAR window starts, and after receiving the RAR message, starts to transmit data to the target gNB 2h-03 while transmitting the RRCConnectionReconfigurationComplete message.

Figure 2I:
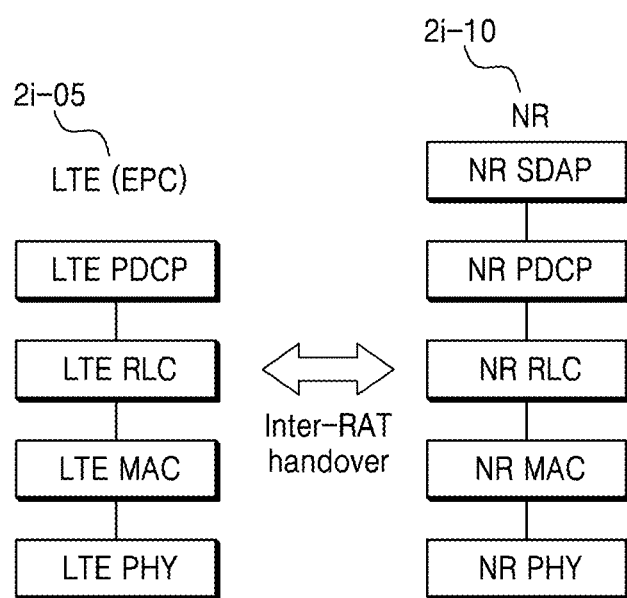
FIG. 2I illustrates a diagram for describing a first embodiment of an operation of a base station in a handover situation between different radio access technologies, according to an embodiment of the disclosure.

FIG. 2I illustrates a diagram for describing a first embodiment of an operation of a base station in a handover situation between different radio access technologies, according to an embodiment of the disclosure.

Referring to FIG. 2I, a structure of a bearer supported in an LTE base station connected to an EPC (LTE core network) may be as denoted by a reference numeral 2i-05 and functions of each layer may be as described with reference to FIG. 2B. Also, a structure of a bearer supported in an NR base station may be as denoted by a reference numeral 2i-10 and functions of each layer may be as described with reference to FIG. 2D. The NR base station may be connected to the EPC and may be connected to 5GC (NR core network).

As described in FIGS. 2B, 2D, and 2I, each layer of the bearer supported in the LTE base station connected to the EPC and each layer of the bearer supported in the NR base station may have different functions.

Thus, the disclosure proposes a method of releasing all pieces of bearer configuration information set in a UE and newly configuring all pieces of bearer configuration information, when a base station instructs handover between different radio access technologies, in particular, when handover is instructed by setting the LTE base station connected to the EPC as a target base station with respect to a UE receiving a service by setting the NR base station as a source base station. Also, in the disclosure, a new indicator (fullConfig) may be defined in an RRCConnectionReconfiguration message to instruct the UE to release all pieces of bearer configuration information set in the UE and newly configure entire configuration information. For example, when the indicator is included in the RRCConnectionReconfiguration message, the UE may release the entire bearer configuration information and newly configure the entire UE configuration information based on received configuration information.

Also, the disclosure proposes a method of releasing all pieces of bearer configuration information set in a terminal and newly configuring all pieces of bearer configuration information, when a base station instructs handover between different radio access technologies, in particular, when handover is instructed by setting the NR base station as a target base station with respect to a UE receiving a service by setting the LTE base station connected to the EPC as a source base station. Also, in the disclosure, the new indicator (fullConfig) may be defined in an RRCConnectionReconfiguration message to instruct the UE to release all pieces of bearer configuration information set in the UE and newly configure entire configuration information. For example, when the indicator is included in the RRCConnectionReconfiguration message, the UE may release the entire bearer configuration information and newly configure the entire UE configuration information based on received configuration information.

Figure 2J:
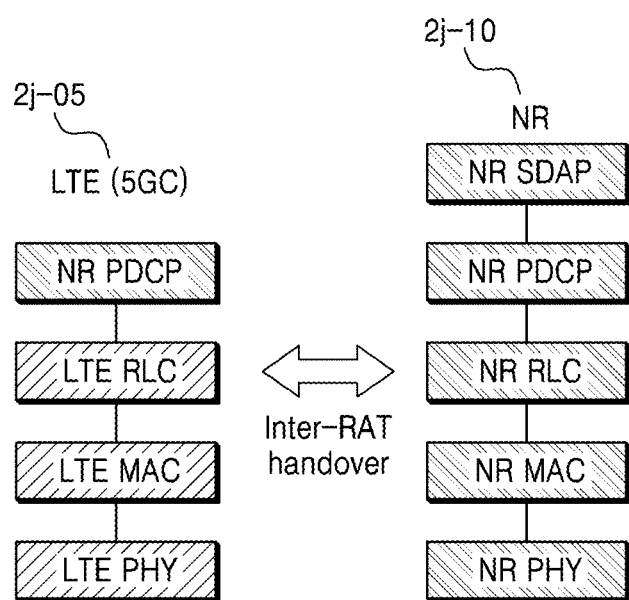
FIG. 2J illustrates a diagram for describing a second embodiment of an operation of a base station in a handover situation between different radio access technologies, according to an embodiment of the disclosure.

FIG. 2J illustrates a diagram for describing a second embodiment of an operation of a base station in a handover situation between different radio access technologies, according to an embodiment of the disclosure.

Referring to FIG. 2J, a structure of a bearer supported in an LTE base station connected to an 5GC (LTE core network) may be as denoted by a reference numeral 2j-05 and functions of each layer may be as described with reference to FIGS. 2B and 2D. Here, each bearer supported in the LTE base station connected to the 5GC may configure and use an NR PDCP layer as a PDCP layer instead of an LTE PDCP layer. Also, a structure of a bearer supported in an NR base station may be as denoted by a reference numeral 2j-10 and functions of each layer may be as described with reference to FIG. 2D. Here, the NR base station may be connected to the EPC and may be connected to 5GC (NR core network).

As described with reference to FIGS. 2B, 2D, and 2I, each layer of the bearer supported in the LTE base station connected to the 5GC and each layer of the bearer supported in the NR base station may have different functions, but in case of a PDCP layer, the LTE base station connected to the 5GC and the NR base station may both support the NR PDCP layer. Also, because an SDAP layer includes mapping information between QoS flow and a bearer from a 5GC core network, the mapping information between the QoS flow and the bearer from the 5GC core network may be useful configuration information to both the LTE base station connected to the 5GC and the NR base station.

Thus, the disclosure proposes a method of storing existing configuration information (for example, configuration information of a PDCP layer or configuration information of a SDAP layer) without releasing all pieces of bearer configuration information set in a UE and newly configuring some pieces of bearer configuration information, when a base station instructs handover between different radio access technologies, in particular, when handover is instructed by setting the LTE base station connected to the 5GC as a target base station with respect to a UE receiving a service by setting the NR base station as a source base station. Also, in the disclosure, the new indicator (fullConfig) may be defined in an RRCConnectionReconfiguration message to instruct the UE to newly configure only some pieces of information without releasing all pieces of bearer configuration information configured in the UE. For example, when the indicator is not included in the RRCConnectionReconfiguration message, the UE may store or maintain the entire or some information (for example, the configuration information of the PDCP layer or SDAP layer) among existing UE information and update newly configured configuration information as a part of the current UE configuration information.

Also, the disclosure proposes a method of storing or maintaining existing configuration information (for example, configuration information of a PDCP layer or configuration information of a SDAP layer) without releasing all pieces of bearer configuration information set in a UE and newly configuring some pieces of bearer configuration information, when a base station instructs handover between different radio access technologies, in particular, when handover is instructed by setting the NR base station as a target base station with respect to a UE receiving a service by setting the LTE base station connected to the 5GC as a source base station. Also, in the disclosure, the new indicator (fullConfig) may be defined in an RRCConnectionReconfiguration message to instruct the UE to newly configure only some pieces of information without releasing all pieces of bearer configuration information configured in the UE. For example, when the indicator is not included in the RRCConnectionReconfiguration message, the UE may store or maintain the entire or some information (for example, the configuration information of the PDCP layer or SDAP layer) among existing UE information and update newly configured configuration information as a part of the current UE configuration information.

Hereinafter, an operation of a UE when the UE is a handover instruction between different radio access technologies according to an operation of a base station described above is described.

When the UE received an RRC message (for example, an RRCConnectionReconfiguration message or an RRCResume message), and successfully completes mobility and leaves an NR base station (or an NR radio access technology)

When the UE received an RRC message (for example, an RRCConnectionReconfiguration message or an RRCResume message), and successfully completes mobility and leaves an LTE base station (or an LTE radio access technology)

The UE resets an MAC layer.

The UE stops all timers that are running.

The UE releases currently configured security configuration information.

The UE releases currently configured configuration information of an RLC layer or the MAC layer.

When it is not instructed to release entire UE configuration information (when the indicator (fullConfig) proposed in the disclosure is not indicated or not included)

The UE stores and maintains the configuration information of the PDCP layer or SDAP layer configured in a source base station (or source radio access technology) to which the UE is currently accessed. The maintained or stored configuration information of the PDCP layer or SDAP layer may be applicable or used in a target base station (or radio access technology).

Otherwise, when it is instructed to release entire UE configuration information (when the indicator (fullConfig) proposed in the disclosure is indicated or included)

The UE releases the currently configured configuration information of the PDCP layer or SDAP layer for all bearers.

Figure 2K:
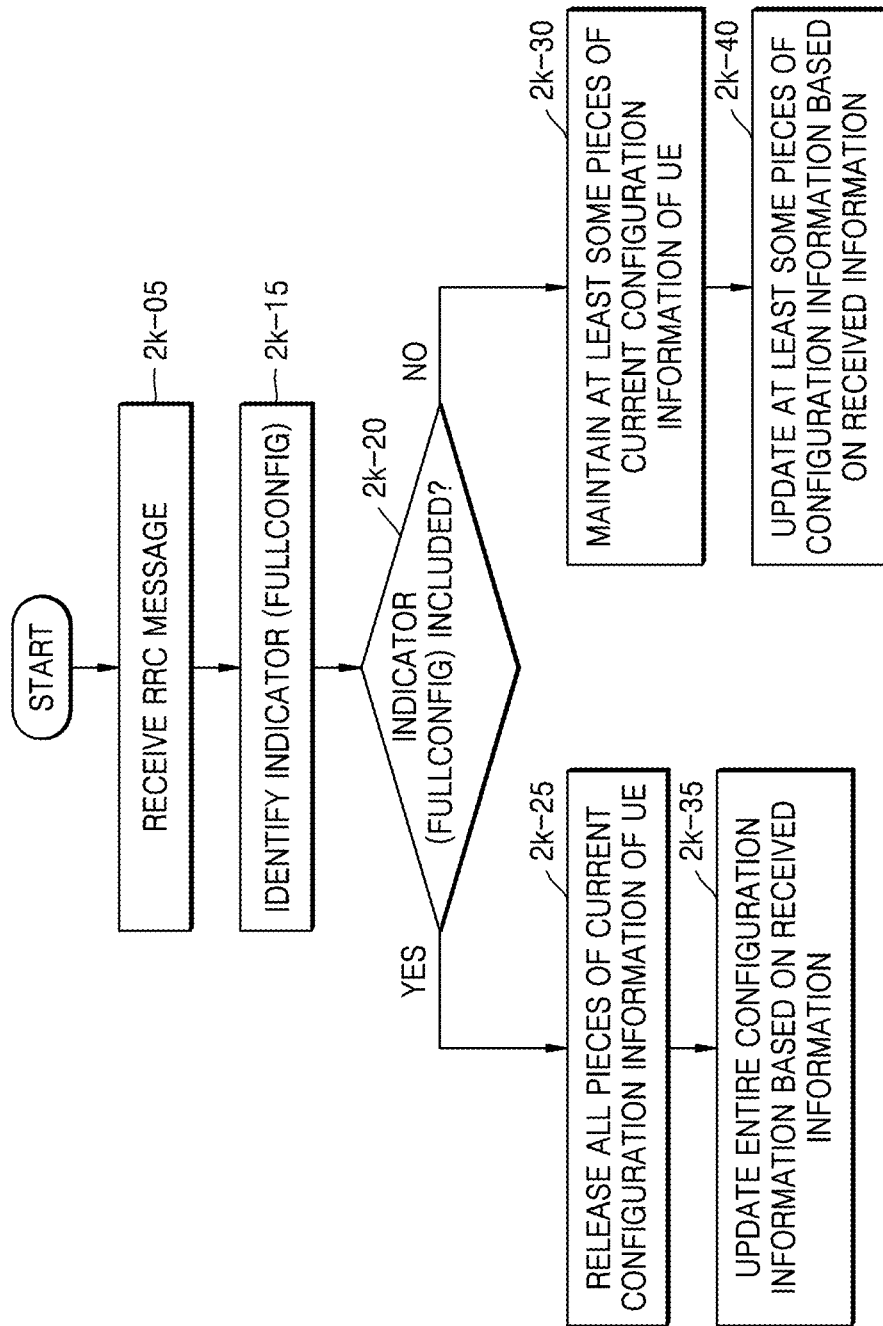
FIG. 2K illustrates a diagram of operations of a UE, according to an embodiment of the disclosure.

FIG. 2K illustrates a diagram of operations of a UE, according to an embodiment of the disclosure.

According to some embodiments of the disclosure, when the UE receives an RRC message (for example, an RRCConnectionReconfiguration message or an RRCResume message) (2k-05), the UE may identify whether an indicator (fullConfig) is included in the received RRC message (2k-15). When it is not instructed to release entire UE configuration information (when the indicator (fullConfig) proposed in FIG. 2G or 2H is not instructed or not included) (2k-20), the UE may store and maintain at least some pieces of configuration information of a PDCP layer or SDAP layer configured in a source base station (or radio access technology) currently accessed by the UE. The maintained or stored configuration information of the PDCP layer or SDAP layer may be applicable in a target base station (or radio access technology) (2k-30). When at least some pieces of the configuration information of the PDCP layer or SDAP layer to be used in the target base station are received from the target base station or the source base station, the UE may apply the received configuration information (2k-40). For example, the UE may update the configuration information of the PDCP layer or SDAP layer by applying the received at least some pieces of the configuration information.

According to an embodiment of the disclosure, when the UE is configured as an electronic device described later with reference to FIG. 2M and the source base station is an LTE base station and the target base station is the NR base station, a first communication processor 2m-12 may be able to transmit at least some pieces of configuration information of the PDCP layer or SDAP layer related to the existing source base station to a second communication processor 2m-14. According to an embodiment of the disclosure, the first communication processor 2m-12 may transmit at least some pieces of the configuration information of the PDCP layer or SDAP layer to the second communication processor 2m-14, and store the configuration information of the PDCP layer or SDAP layer. According to another embodiment of the disclosure, the first communication processor 2m-12 may transmit at least some pieces of the configuration information of the PDCP layer or SDAP layer to the second communication processor 2m-14, and release the configuration information of the PDCP layer or SDAP layer.

According to another embodiment of the disclosure, when the UE is configured as the electronic device described later with reference to FIG. 2M and the source base station is an NR base station and the target base station is the LTE base station, the second communication processor 2m-14 may transmit at least some pieces of configuration information of the PDCP layer or SDAP layer related to the existing source base station to the first communication processor 2m-12. According to an embodiment of the disclosure, the second communication processor 2m-14 may transmit at least some pieces of the configuration information of the PDCP layer or SDAP layer to the first communication processor 2m-12, and store the configuration information of the PDCP layer or SDAP layer. According to another embodiment of the disclosure, the second communication processor 2m-14 may transmit at least some pieces of the configuration information of the PDCP layer or SDAP layer to the first communication processor 2m-12, and release the configuration information of the PDCP layer or SDAP layer.

Otherwise, when it is instructed to release the entire UE configuration information (when the indicator (fullConfig) proposed in FIG. 2G or 2H is instructed or indicated), the UE may release the configuration information of the PDCP layer or SDAP layer for all currently configured bearers (2k-25). When the UE receives at least some pieces of the configuration information of the PDCP layer or SDAP layer to be used in the target base station are received from the target base station or the source base station, the UE may apply the received configuration information (2k-35). For example, the UE may update the entire configuration information of the PDCP layer or SDAP layer by applying the received at least some pieces of the configuration information.

According to an embodiment of the disclosure, when the UE is configured as the electronic device described later with reference to FIG. 2M and the source base station is an LTE base station and the target base station is the NR base station, a first communication processor 2m-12 may be able to store the configuration information of the PDCP layer or SDAP layer related to the existing source base station. According to another embodiment of the disclosure, the first communication processor 2m-12 may be able to release the configuration information of the PDCP layer or SDAP layer related to the existing source base station.

Figure 2L:
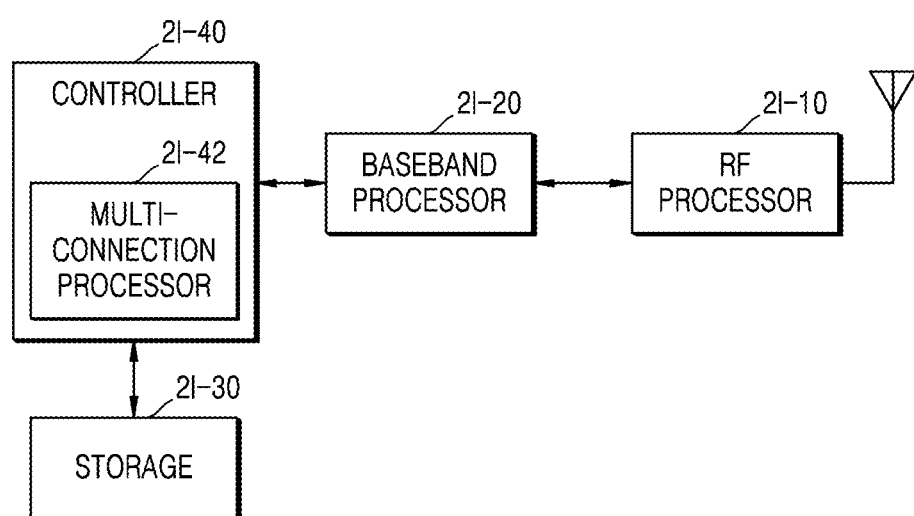
FIG. 2L illustrates a diagram of a structure of a UE, according to an embodiment of the disclosure.

FIG. 2L illustrates a diagram of a structure of a UE, according to an embodiment of the disclosure.

Referring to FIG. 2L, the UE includes an RF processor 2l-10, a baseband processor 2l-20, a storage 2l-30, and a controller 2l-40. However, the UE is not limited thereto, and may include more or less components than those shown in FIG. 2L.

The RF processor 2l-10 may perform functions for transmitting and receiving signals through radio channels, e.g., signal band conversion and amplification. That is, the RF processor 2l-10 up-converts a baseband signal provided from the baseband processor 2l-20 to an RF band signal and transmits the RF band signal through an antenna, and down-converts an RF band signal received through an antenna, to a baseband signal. For example, the RF processor 2l-10 may include a transmit filter, a receive filter, an amplifier, a mixer, an oscillator, a DAC, and an ADC. Although only a single antenna is illustrated in FIG. 2L, the UE may include multiple antennas. The RF processor 2l-10 may include a plurality of RF chains. The RF processor 2l-10 may perform beamforming. For beamforming, the RF processor 2l-10 may adjust phases and amplitudes of signals transmitted or received through multiple antennas or antenna elements. The RF processor 2l-10 may perform MIMO and may receive data of multiple layers in the MIMO operation. The RF processor 2l-10 may perform received beam sweeping by appropriately configuring multiple antennas or antenna elements, or adjust a direction and a beam width of the received beam to coordinate with a transmit beam, under the control of the controller 2l-40.

The baseband processor 2l-20 may convert between a baseband signal and a bitstream based on physical layer specifications of a system. For example, for data transmission, the baseband processor 2l-20 generates complex symbols by encoding and modulating a transmit bitstream. For data reception, the baseband processor 2l-20 may reconstruct a received bitstream by demodulating and decoding a baseband signal provided from the RF processor 2l-10. For example, according to an OFDM scheme, for data transmission, the baseband processor 2l-20 generates complex symbols by encoding and modulating a transmit bitstream, maps the complex symbols to subcarriers, and then configures OFDM symbols by performing IFFT and CP insertion. For data reception, the baseband processor 2l-20 may split a baseband signal provided from the RF processor 2l-10, in OFDM symbol units, reconstruct signals mapped to subcarriers by performing FFT, and then reconstruct a received bitstream by demodulating and decoding the signals.

The baseband processor 2l-20 and the RF processor 2l-10 transmit and receive signals as described above. As such, each of the baseband processor 2l-20 and the RF processor 2l-10 may also be called a transmitter, a receiver, a transceiver, or a communicator. At least one of the baseband processor 2l-20 or the RF processor 2l-10 may include multiple communication modules to support multiple different radio access technologies. Also, at least one of the baseband processor 2l-20 or the RF processor 2l-10 may include multiple communication modules to process signals of different frequency bands. For example, the different radio access technologies may include an LTE network, NR network, etc. The different frequency bands may include an SHF (e.g., 2.5 GHz and 5 GHZ) band and a mmWave (e.g., 60 GHz) band. The UE may transmit or receive a signal to or from a base station by using the baseband processor 2*l*-20 and the RF processor 2*l*-10, and the signal may include control information and data.

The storage 2*l*-30 may store data for operation of the UE, e.g., basic programs, application programs, and configuration information. The storage 2*l*-30 may provide the stored data upon request by the controller 2*l*-40. The storage 2*l*-30 may be configured in a storage medium, such as ROM, RAM, a hard disk, CD-ROM, or DVD, or a combination thereof. Also, the storage 2*l*-30 may be configured in a plurality of memories.

The controller 2*l*-40 may control overall operations of the UE. For example, the controller 2*l*-40 may transmit and receive signals through the baseband processor 2*l*-20 and the RF processor 2*l*-10. The controller 2*l*-40 may record and read data on and from the storage 2*l*-30. In this regard, the controller 2*l*-40 may include at least one processor. For example, the controller 2*l*-40 may include a CP for controlling communications and an AP for controlling an upper layer such as an application program. Also, the controller 2*l*-40 may include multi-connection processor 2*l*-42. Also, at least one component in the UE may be embodied in one chip.

Figure 2M:
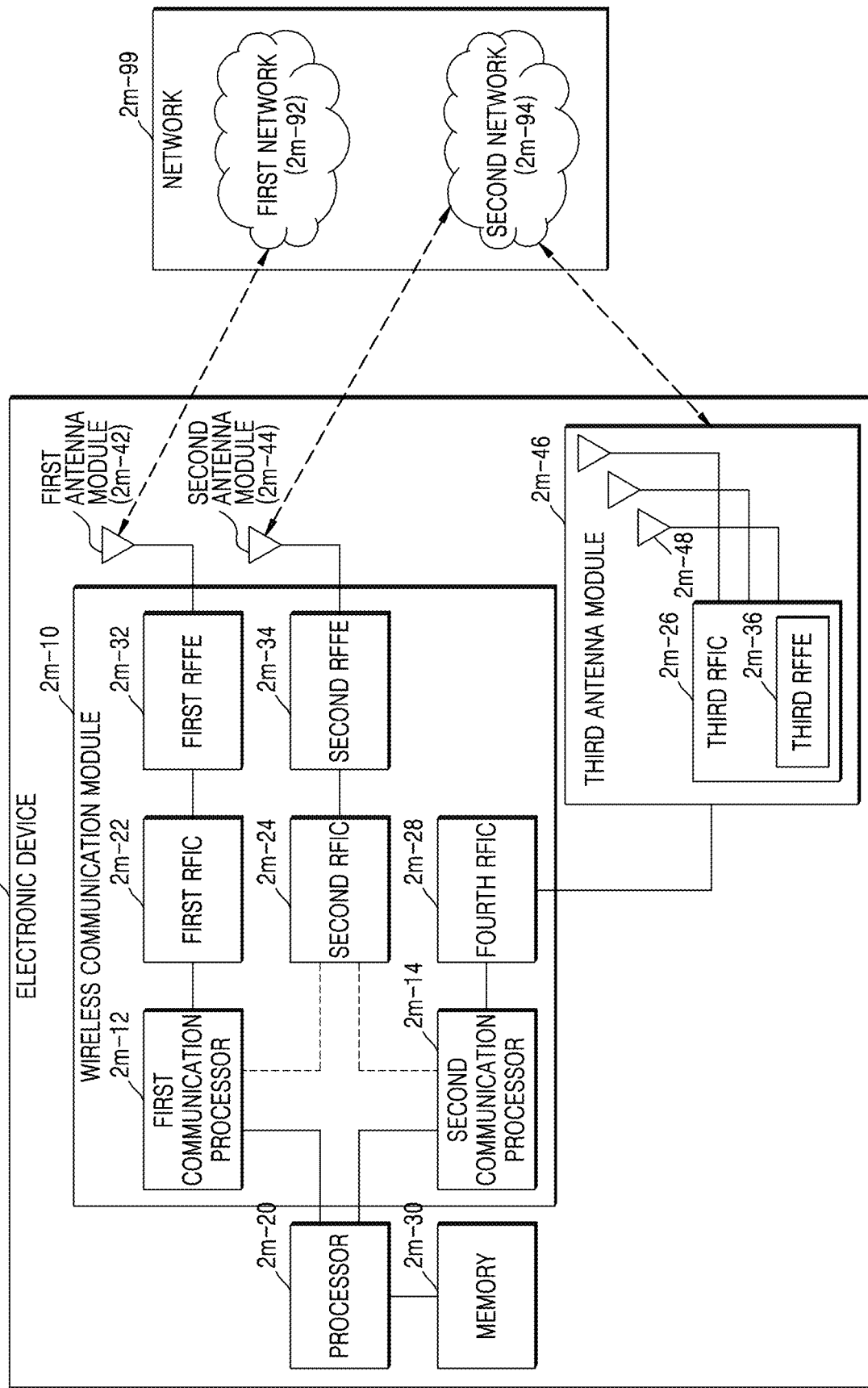
FIG. 2M illustrates a diagram showing a structure of an electronic device for supporting legacy network communication and 5G network communication, according to an embodiment of the disclosure.

FIG. 2M illustrates a diagram showing a structure of an electronic device 2*m*-01 for supporting legacy network communication and 5G network communication, according to an embodiment of the disclosure.

Referring to FIG. 2M, the electronic device 2*m*-01 may include the first communication processor 2*m*-12, the second communication processor 2*m*-14, a first RFIC 2*m*-22, a second RFIC 2*m*-24, a third RFIC 2*m*-26, a fourth RFIC 2*m*-28, a first RFFE 2*m*-32, a second RFFE 2*m*-34, a first antenna module 2*m*-42, a second antenna module 2*m*-44, and an antenna 2*m*-48. The electronic device 2*m*-01 may further include a processor 2*m*-20 and a memory 2*m*-30. A network 2*m*-99 may include a first network 2*m*-92 and a second network 2*m*-94. According to another embodiment of the disclosure, the electronic device 2*m*-01 may further include at least one component among those shown in FIG. 2M and the network 2*m*-99 may further include at least one other network. According to an embodiment of the disclosure, the first communication processor 2*m*-12, the second communication processor 2*m*-14, the first RFIC 2*m*-22, the second RFIC 2*m*-24, the fourth RFIC 2*m*-28, the first RFFE 2*m*-32, and the second RFFE 2*m*-34 may form at least a part of a wireless communication module 2*m*-10. According to another embodiment of the disclosure, the fourth RFIC 2*m*-28 may be omitted or may be included as a part of the third RFIC 2*m*-26.

The first communication processor 2*m*-12 may support establishment of a communication channel of a band to be used for wireless communication with the first network 2*m*-92, and legacy network communication through the established communication channel. According to various embodiments of the disclosure, the first network 2*m*-92 may be a legacy network including a 2G, 3G, 4G, or LTE network. The second communication processor 2*m*-14 may support establishment of a communication channel corresponding to a band (e.g., about 6 GHz to about 60 GHZ) assigned among bands to be used for wireless communication with the second network 2*m*-94, and 5G network communication through the established communication channel. According to various embodiments of the disclosure, the second network 2*m*-94 may be a 5G network defined by 3GPP. In addition, according to an embodiment of the disclosure, the first communication processor 2*m*-12 or the second communication processor 2*m*-14 may support establishment of a communication channel corresponding to another band (e.g., about 6 GHz or lower) assigned among bands to be used for wireless communication with the second network 2*m*-94, and 5G network communication through the established communication channel. According to an embodiment of the disclosure, the first communication processor 2*m*-12 and the second communication processor 2*m*-14 may be implemented in a single chip or a single package. According to various embodiments of the disclosure, the first communication processor 2*m*-12 or the second communication processor 2*m*-14 may be implemented in a single chip or a single package with the processor 2*m*-20, an auxiliary processor, or a communication module.

The first RFIC 2*m*-22 may convert a baseband signal generated by the first communication processor 2*m*-12 into an RF signal of about 700 MHz to about 3 GHz used for the first network 2*m*-92 (for example, a legacy network), during transmission. During reception, the RF signal may be obtained from the first network 2*m*-92 (for example, a legacy network) through an antenna (for example, the first antenna module 2*m*-42), and preprocessed through an RFFE (for example, the first RFFE 2*m*-32). The first RFIC 2*m*-22 may convert the preprocessed RF signal into a baseband signal to be processed by the first communication processor 2*m*-12.

The second RFIC 2*m*-24 may convert a baseband signal generated by the first communication processor 2*m*-12 or the second communication processor 2*m*-14 into an RF signal (hereinafter, referred to as a 5G Sub6 RF signal) of a Sub6 band (for example, about 6 GHz or lower) used for the second network 2*m*-94 (for example, a 5G network), during transmission. During reception, the 5G Sub6 RF signal may be obtained from the second network 2*m*-94 (for example, a 5G network) through an antenna (for example, the second antenna module 2*m*-44), and preprocessed through an RFFE (for example, the second RFFE 2*m*-34). The second RFIC 2*m*-24 may convert the preprocessed 5G Sub6 RF signal into a baseband signal to be processed by a communication processor corresponding to the first communication processor 2*m*-12 or the second communication processor 2*m*-14.

The third RFIC 2*m*-26 may convert a baseband signal generated by the second communication processor 2*m*-14 into an RF signal (hereinafter, referred to as a 5G Above6 RF signal) of a 5G Above6 band (for example, about 6 GHz to about 60 GHz) to be used for the second network 2*m*-94 (for example, a 5G network), during transmission. During reception, the 5G Above6 RF signal may be obtained from the second network 2*m*-94 (for example, a 5G network) through an antenna (for example, the antenna 2*m*-48), and preprocessed through a third RFFE 2*m*-36. The third RFIC 2*m*-26 may convert the preprocessed 5G Above6 RF signal into a baseband signal to be processed by the second communication processor 2*m*-14. According to an embodiment of the disclosure, the third RFFE 2*m*-36 may be configured as a part of the third RFIC 2*m*-26.

According to an embodiment of the disclosure, the electronic device 2*m*-01 may include the fourth RFIC 2*m*-28 separately from or as a part of the third RFIC 2*m*-26. In this case, the fourth RFIC 2*m*-28 may convert the baseband signal generated by the second communication processor 2*m*-14 into an RF signal (hereinafter, referred to as an intermediate frequency (IF) signal) of an IF band (for example, about 9 GHz to about 11 GHZ), and transmit the IF signal to the third RFIC 2*m*-26. The third RFIC 2*m*-26 may convert the IF signal into a 5G Above6 RF signal. During reception, the 5G Above6 RF signal may be received from the second network 2*m*-94 (for example, a 5G network) through an antenna (for example, the antenna 2*m*-48) and converted into the IF signal by the third RFIC 2m-26. The fourth RFIC 2m-28 may convert the IF signal into a baseband signal to be processed by the second communication processor 2m-14.

According to an embodiment of the disclosure, the first RFIC 2m-22 and the second RFIC 2m-24 may be implemented as at least a part of a single chip or a single package. According to an embodiment of the disclosure, the first RFFE 1o-32 and the second RFFE 1o-34 may be implemented as at least a part of a single chip or a single package. According to an embodiment of the disclosure, at least one of the first antenna module 2m-42 or the second antenna module 2m-44 may be omitted or may be combined with another antenna module to process RF signals of a plurality of corresponding bands.

According to an embodiment of the disclosure, the third RFIC 2m-26 and the antenna 2m-48 may be arranged on the same substrate to configure a third antenna module 2m-46. For example, the wireless communication module 2m-10 or the processor 2m-20 may be arranged on a first substrate (for example, a main PCB). In this case, the third RFIC 2m-26 may be arranged on a partial region (for example, a bottom surface) of a second substrate (for example, a sub PCB) different from the first substrate, and the antenna 2m-48 may be arranged on another partial region (for example, a top surface) thereof to form the third antenna module 2m-46. According to an embodiment of the disclosure, the antenna 2m-48 may include, for example, an antenna array used for beamforming. By arranging the third RFIC 2m-26 and the antenna 2m-48 on the same substrate, the length of a transmission path therebetween may be reduced. Thus, for example, the loss (for example, attenuation) of a signal of a high frequency band (for example, about 6 GHz to about 60 GHz) used for 5G network communication caused by the transmission path may be prevented. Accordingly, the communication quality or speed between the electronic device 2m-01 and the second network 2m-94 (for example, a 5G network) may be increased.

The second network 2m-94 (for example, a 5G network) may be operated independently from (for example, SA) or in connection with (for example, NSA) the first network 2m-92 (for example, a legacy network). For example, a 5G network may include only an access network (for example, a 5G RAN or an NG RAN) and not include a core network (for example, an NGC). In this case, the electronic device 2m-01 may access an access network of the 5G network and access an external network (for example, the Internet) under control of a core network (for example, an EPC) of the legacy network. Protocol information (for example, LTE protocol information) for communication with the legacy network) and protocol information (for example, new radio (NR) protocol information) for communication with the 5G network may be stored in the memory 2m-30 and accessed by another component (for example, the processor 2m-20, the first communication processor 2m-12, or the second communication processor 2m-14).

Figure 2N:
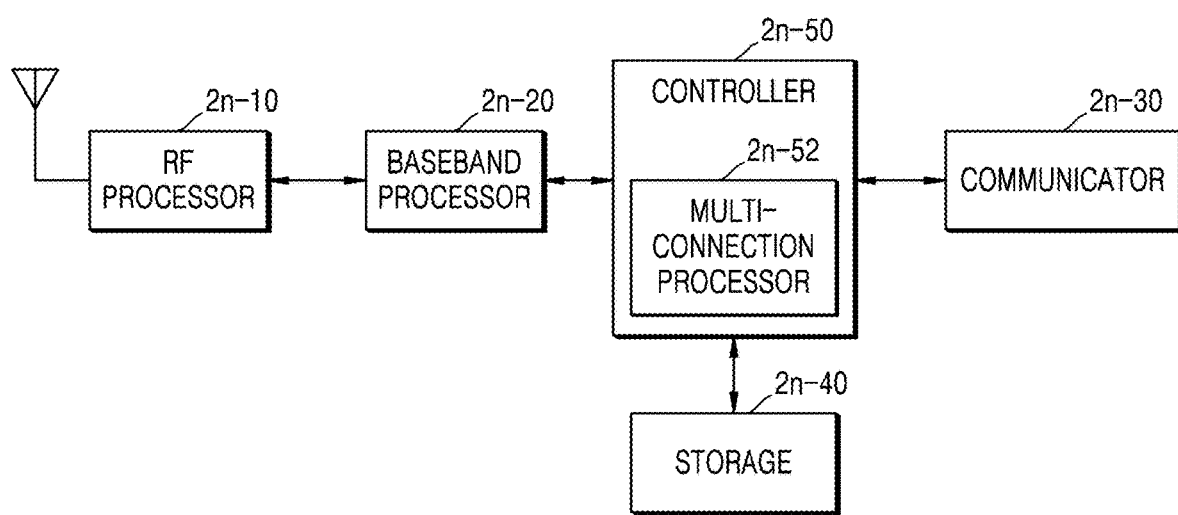
FIG. 2N illustrates a block diagram of a structure of a base station in a wireless communication system, according to an embodiment of the disclosure.

FIG. 2N illustrates a block diagram of a structure of a base station in a wireless communication system, according to an embodiment of the disclosure.

Referring to FIG. 2N, the base station may include an RF processor 2n-10, a baseband processor 2n-20, a communicator 2n-30, a storage 2n-40, and a controller 2n-50. However, the base station is not limited thereto and may include more or less components than those shown in FIG. 2N.

The RF processor 2n-10 may perform functions for transmitting and receiving signals through radio channels, e.g., signal band conversion and amplification. That is, the RF processor 2n-10 up-converts a baseband signal provided from the baseband processor 2n-20, to an RF band signal and transmit the RF band signal through an antenna, and down-converts an RF band signal received through an antenna, to a baseband signal. For example, the RF processor 2n-10 may include a transmit filter, a receive filter, an amplifier, a mixer, an oscillator, a DAC, and an ADC. Although only a single antenna is illustrated in FIG. 2N, the RF processor 2n-10 may include a plurality of antennas. The RF processor 2n-10 may include a plurality of RF chains. In addition, the RF processor 2n-10 may perform beamforming. For beamforming, the RF processor 2n-10 may adjust phases and amplitudes of signals transmitted or received through multiple antennas or antenna elements. The RF processor 2n-10 may perform DL MIMO by transmitting data of two or more layers.

The baseband processor 2n-20 may convert between a baseband signal and a bitstream based on physical layer specifications of a first radio access technology. For example, for data transmission, the baseband processor 2n-20 may generate complex symbols by encoding and modulating a transmit bitstream. For data reception, the baseband processor 2n-20 reconstructs a received bitstream by demodulating and decoding a baseband signal provided from the RF processor 2n-10. For example, according to an OFDM scheme, for data transmission, the baseband processor 2n-20 generates complex symbols by encoding and modulating a transmit bitstream, maps the complex symbols to subcarriers, and then configures OFDM symbols by performing IFFT and CP insertion. For data reception, the baseband processor 2n-20 may split a baseband signal provided from the RF processor 2n-10, in OFDM symbol units, reconstruct signals mapped to subcarriers by performing FFT, and then reconstruct a received bitstream by demodulating and decoding the signals. The baseband processor 2n-20 and the RF processor 2n-10 may transmit and receive signals as described above. As such, each of the baseband processor 2n-20 and the RF processor 2n-10 may also be called a transmitter, a receiver, a transceiver, a communicator, or a wireless communicator. The base station may transmit or receive a signal to or from a UE by using the baseband processor 2n-20 and the RF processor 2n-10, and the signal may include control information and data.

The communicator 2n-30 may provide an interface for communicating with other nodes in a network. According to some embodiments of the disclosure, the communicator 2n-30 may be a backhaul communicator.

The storage 2n-40 may store data for operation of the base station described above, e.g., basic programs, application programs, and configuration information. In particular, the storage 2n-40 may store information about bearers allocated for a connected UE, a measurement report transmitted from the connected UE, etc. The storage 2n-40 may store criteria information used to determine whether to provide or release multi-connectivity to or from the UE. The storage 2n-40 may provide the stored data upon request by the controller 2n-50. The storage 2n-40 may be configured in a storage medium, such as ROM, RAM, a hard disk, CD-ROM, or DVD, or a combination thereof. Also, the storage 2n-40 may be configured in a plurality of memories.

The controller 2n-50 may control overall operations of the base station. For example, the controller 2n-50 may transmit and receive signals through the baseband processor 2n-20 and the RF processor 2n-10 or through the communicator 2n-30. The controller 2n-50 may record and read data on and from the storage 2n-40. In this regard, the controller 2n-50 may include at least one processor. Also, the controller 2n-50 may include multi-connection processor 2n-52. Also, at least one component in the base station may be embodied in one chip.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication for performing handover between different radio access technologies, the method comprising:
receiving a radio resource control (RRC) message;
identifying whether a full configuration indicator is present in the RRC message;
in case that the full configuration indicator is not present in the RRC message, not releasing configuration information of a new radio (NR) packet data convergence protocol (PDCP) layer and a service data adaptation protocol (SDAP) layer configured in a source base station (BS); and
based on an identification that the full configuration indicator is not present in the RRC message, reusing, for a target BS, the configuration information of the NR PDCP layer and the SDAP layer configured in the source BS.

2. The method of claim 1 further comprising:
in case that the full configuration indicator is present in the RRC message, releasing the configuration information of the NR PDCP layer and the SDAP layer configured in the source BS for all bearers.

3. The method of claim 1 further comprising at least one of:
resetting a media access control (MAC) layer;
stopping all timers that are running;
releasing configured security configuration information; or
releasing configuration information of a radio link control (RLC) layer or the MAC layer.

4. The method of claim 1, wherein the RRC message comprises an RRC reconfiguration message or an RRC resume message.

5. The method of claim 1 further comprising:
identifying successful completion of the handover between the different radio access technologies.

6. The method of claim 1, wherein the source BS is NR and the target BS is evolved universal terrestrial radio access (E-UTRA).

7. The method of claim 1, wherein the source BS is E-UTRA and the target BS is NR.

8. A user equipment (UE) in a wireless communication for performing handover between different radio access technologies, the UE comprising:
a transceiver;
a memory storing one or more instructions; and
at least one processor configured to execute the one or more instructions to:
receive a radio resource control (RRC) message;
identify whether a full configuration indicator is present in the RRC message;
in case that the full configuration indicator is not present in the RRC message, not release configuration information of a new radio (NR) packet data convergence protocol (PDCP) layer and a service data adaptation protocol (SDAP) layer configured in a source base station (BS); and
based on an identification that the full configuration indicator is not present in the RRC message, reuse, for a target BS, the configuration information of the NR PDCP layer and the SDAP layer configured in the source BS.

9. The UE of claim 8, the at least one processor further configured to:
in case that the full configuration indicator is present in the RRC message, release the configuration information of the NR PDCP layer and the SDAP layer configured in the source BS for all bearers.

10. The UE of claim 8, the at least one processor further configured to:
reset a media access control (MAC) layer;
stop all timers that are running;
release configured security configuration information; or
release configuration information of a radio link control (RLC) layer or the MAC layer.

11. The UE of claim 8, wherein the RRC message comprises an RRC reconfiguration message or an RRC resume message.

12. The UE of claim 8, the at least one processor further configured to:
identify successful completion of the handover between the different radio access technologies.

13. The UE of claim 8, wherein the source BS is NR and the target BS is evolved universal terrestrial radio access (E-UTRA).

14. The UE of claim 8, wherein the source BS is E-UTRA and the target BS is NR.

15. A method performed by a source base station (BS) in a wireless communication for performing handover between different radio access technologies, the method comprising:
transmitting, to a user equipment (UE), a radio resource control (RRC) message, wherein a full configuration indicator is present or is not present in the RRC message,
wherein the full configuration indicator is associated with whether the UE releases or does not release configuration information of a new radio (NR) packet data convergence protocol (PDCP) layer and a service data adaptation protocol (SDAP) layer configured in the source BS, and
wherein the full configuration indicator is associated with whether the UE reuses, for a target BS, the configuration information of the NR PDCP layer and the SDAP layer configured in the source BS.

16. The method of claim 15, wherein the RRC message comprises an RRC reconfiguration message or an RRC resume message.

17. A source base station (BS) in a wireless communication for performing handover between different radio access technologies, the source BS comprising:
a transceiver;
a memory storing one or more instructions; and
at least one processor configured to execute the one or more instructions to:
transmit, to a user equipment (UE), a radio resource control (RRC) message, wherein a full configuration indicator is present or is not present in the RRC message,
wherein the full configuration indicator is associated with whether the UE releases or does not release configuration information of a new radio (NR) packet data convergence protocol (PDCP) layer and a service data adaptation protocol (SDAP) layer configured in the source BS, and wherein the full configuration indicator is associated with whether the UE reuses, for a target BS, the configuration information of the NR PDCP layer and the SDAP layer configured in the source BS.

18. The source BS of claim 17, wherein the RRC message comprises an RRC reconfiguration message or an RRC resume message.

19. The source BS of claim 17, wherein the source BS is NR and the target BS is evolved universal terrestrial radio access (E-UTRA).

20. The source BS of claim 17, wherein the source BS is E-UTRA and the target BS is NR.

* * * * *